United States Patent
Novo Diaz

(10) Patent No.: US 12,028,403 B2
(45) Date of Patent: Jul. 2, 2024

(54) OBSERVATION OF RESOURCES BY A CoAP CLIENT

(71) Applicant: Telefonaktiebolaget LM Ericsson (publ), Stockholm (SE)

(72) Inventor: Oscar Novo Diaz, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 29 days.

(21) Appl. No.: 17/786,823

(22) PCT Filed: Dec. 17, 2019

(86) PCT No.: PCT/SE2019/051298
§ 371 (c)(1),
(2) Date: Jun. 17, 2022

(87) PCT Pub. No.: WO2021/126024
PCT Pub. Date: Jun. 24, 2021

(65) Prior Publication Data
US 2023/0353627 A1     Nov. 2, 2023

(51) Int. Cl.
*H04L 67/04*     (2022.01)
*H04L 67/12*     (2022.01)

(52) U.S. Cl.
CPC .............. *H04L 67/04* (2013.01); *H04L 67/12* (2013.01)

(58) Field of Classification Search
None
See application file for complete search history.

(56) References Cited

U.S. PATENT DOCUMENTS

| 2016/0006818 A1* | 1/2016 | Van Den Abeele .. H04L 67/141 709/227 |
| 2016/0119037 A1* | 4/2016 | Won ..................... H04B 7/0619 370/328 |
| 2016/0246783 A1* | 8/2016 | Brown ................ H04L 41/0866 |

(Continued)

FOREIGN PATENT DOCUMENTS

| CN | 107071826 A | 8/2017 |
| WO | 2017040948 A1 | 3/2017 |
| WO | 2018013916 A1 | 1/2018 |

OTHER PUBLICATIONS

Extended European Search Report dated Oct. 21, 2022 for Application No. 19956306.5, consisting of 11 pages.

(Continued)

*Primary Examiner* — Joshua Joo
(74) *Attorney, Agent, or Firm* — Weisberg I.P. Law, P.A.

(57) ABSTRACT

A CoAP client sends to a CoAP server a request for information about a resource, the request for information including a time period option, wherein the time period option includes a first time period value that indicates a period of time prior to the sending of the request for information over which information about the resource is requested. The CoAP client receives a response to the request for information. In another embodiment, a CoAP client sends to a CoAP server a CoAP Observe registration relating to one or more resources, the CoAP Observe registration including an option, the option including a first value that indicates that the CoAP server should pause notifications for one or more registrations corresponding to one or more resources.

13 Claims, 20 Drawing Sheets

(56) References Cited

U.S. PATENT DOCUMENTS

| | | | | |
|---|---|---|---|---|
| 2017/0086010 A1* | 3/2017 | Jiménez | ............... | H04W 4/50 |
| 2017/0104774 A1* | 4/2017 | Vasseur | ............... | G06N 20/00 |
| 2017/0278004 A1* | 9/2017 | McElhinney | ............ | G06N 5/04 |
| 2018/0276970 A1* | 9/2018 | Savolainen | ........... | A61B 5/0002 |
| 2019/0075149 A1* | 3/2019 | Lu | ........................ | H04L 65/70 |
| 2020/0092696 A1* | 3/2020 | Ly | ........................ | H04L 69/329 |
| 2020/0374334 A1* | 11/2020 | Shakir | ................. | H04L 41/0853 |
| 2020/0404062 A1* | 12/2020 | Wang | ..................... | G06Q 10/06 |
| 2022/0015096 A1* | 1/2022 | Na | ......................... | H04L 67/60 |
| 2022/0182436 A1* | 6/2022 | Saarnivala | .............. | H04W 4/70 |

OTHER PUBLICATIONS

International Search Report and Written Opinion dated Nov. 6, 2020 for International Application No. PCT/SE2019/051298 filed Dec. 17, 2019, consisting of 20 pages.
Li et al. Conditional observe in CoAP; Huawei Technologies; University of Murcia; Internet-Draft, Oct. 15, 2014, consisting of 14 pages.
Veillette et al. Constrained Objects Language; Trilliant Networks Inc.; Tridonic GmbH & Co KG; Internet-Draft; Jul. 18, 2016, consisting of 41 pages.
Shelby et al. The Constrained Application Protocol (CoAP); Universitaet Bremen TZI; Request for Comments; Internet Engineering Task Force (IETF); Jun. 2014, consisting of 112 pages.
Hartke K.; Observing Resources in the Constrained Application Protocol (CoAP); Universitaet Bremen TZI; Internet Engineering Task Force (IETF); Request for Comments; Sep. 2015, consisting of 30 pages.
European Search Report dated Jan. 29, 2024 for Application No. 19956306.5, consisting of 9 pages.

* cited by examiner

OBSERVATION OF RESOURCES BY A CoAP CLIENT

CROSS-REFERENCE TO RELATED APPLICATIONS

This application is a Submission Under 35 U.S.C. § 371 for U.S. National Stage Patent Application of International Application Number: PCT/SE2019/051298, filed Dec. 17, 2022 entitled "OBSERVATION OF RESOURCES BY A COAP CLIENT," the entirety of which is incorporated herein by reference.

TECHNICAL FIELD

The present disclosure relates to a CoAP server that is operable to provide information about at least one resource, and to a CoAP client. The present disclosure also relates to methods performed by a CoAP server and a CoAP client, and to a computer program and a computer program product configured, when run on a computer to carry out methods for operation of a CoAP server and CoAP client.

BACKGROUND

The "Internet of Things" (IoT) refers to devices (for example, digital machines, computing devices and mechanical devices) enabled for communication network connectivity, so that these devices may be remotely managed, and data collected or required by the devices may be exchanged between individual devices and between devices and application servers. Such devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices.

The constrained nature of IoT devices has prompted the design and implementation of new protocols and mechanisms. The Constrained Application Protocol (CoAP), as defined in RFC 7252, is one example of a protocol designed for IoT applications in constrained nodes and constrained networks. CoAP provides a request for information-response based RESTful communication architecture between constrained nodes or between constrained nodes and nodes on the Internet. CoAP can easily be integrated to the web and web services by translating CoAP messages to HTTP.

CoAP follows a client/server model and employs a two-layer structure, where these two layers are the Message Layer, and the Request/Response layer. The Message Layer supports four types of messages: CON (confirmable), NON (non-confirmable), ACK (acknowledgement), and RST (reset), as defined in RFC 7252. The Request/Response layer supports methods such as GET, PUT, POST and DELETE (as defined in RFC 7252), allowing for the access, modification, or deletion of resources.

Various protocol extensions for CoAP exist, providing additional features. One example is the Observe mechanism, as defined in RFC 7641, which enables CoAP clients to "observe" resources, indicating that the CoAP client wishes to receive a notification of the current representation of a resource whenever the CoAP server updates the state of that resource. In this manner, the CoAP client may avoid the need to continuously pole the CoAP server for the current state of the resource, reducing power consumption and network traffic. A CoAP client may register its interest in a resource by sending an extended GET request. The extended GET request includes an Observe option, a value of which may be set to 0 (Observe registration) or 1 (Observe deregistration). If the value of the Observe option included in the request is set to 0, the CoAP server will add the CoAP client to a list of observers of the resource. If the value of the Observe option included in the Request is set to 1, the CoAP server will remove the CoAP client from the list of observers of the resource.

Whenever the state of a resource changes, the CoAP server responsible for that resource will notify the state change to each CoAP client in its list of observers of the current state of the resource. Each notification is an additional CoAP response message sent by the CoAP server in reply to an original Observe registration, and includes a complete, updated representation of the new resource state. This CoAP response also comprises an Observe option, and in these notification responses, the value of the Observe option comprises a sequence number for correctly ordering the notifications and enabling reordering detection. All notifications carry the token specified by the CoAP client in the original Observe registration, enabling the CoAP client to correctly correlate notifications to the original request.

FIG. 1 is a message flow diagram illustrating example exchanges between a CoAP client 102 and a CoAP server 104 according to the Observe procedure. In step 106, the CoAP client 102 registers its interest in a resource by sending a request to the CoAP server 104 (Observe registration). As discussed above, the Observe registration includes an Observe option with value 0. In this illustrated example, the CoAP client registers its interest in a temperature resource. This temperature resource may relate to, for example, a temperate sensor associated with the CoAP server 104. The Observe registration further comprises a token that has been specified by the CoAP client 102. In this illustrated example, the value of the token is 0x4a.

Responsive to receiving the Observe registration communicated by the CoAP client 102 in step 106, the CoAP server 104 adds the CoAP client 102 to the list of observers of the resource and, in step 108, sends a notification to the CoAP client 102 comprising a representation of the current state of the target resource. The initial notification sent by the CoAP server 104 in step 108 comprises the representation of the current state of the temperature resource: 22.9 degrees Celsius, an Observe option with a value of 12 (a sequence number for ordering notifications), and the token value form the Observe registration of 0x4a.

In step 110, the CoAP server 104 then sends the CoAP client 102 a subsequent notification comprising an updated representation of the target resource in response to a change in the state of that resource. The subsequent notification sent by the CoAP server 104 in step 110 comprises the Observe option with a value of 44, the current state of the temperature resource: 22.8 degrees Celsius, and the token value 0x4a.

In step 112, the CoAP server 104 then sends the CoAP client 102 another notification comprising a further updated representation of the target resource in response to another change in the state of that resource. The notification sent by the CoAP server 104 in step 112 comprises the Observe option with a value of 60, the current state of the temperature resource: 23.1 degrees Celsius, and the token 0x4a.

As stated above, the value of the Observe option in the notifications communicated in steps 108, 110, and 112 acts as a sequence number to allow the CoAP client 102 to correctly order notifications sent by the CoAP server 104. Furthermore, the value of the token in the notifications communicated in steps 108, 110, and 112, enables the CoAP client 102 to correlate these received notifications to the Observe registration request that was communicated to the CoAP server 104 in step 106.

Thus, the Observe mechanism allows a CoAP client to be notified with an updated representation of a target resource whenever the state of that resource changes.

A situation may be envisaged in which a CoAP client that is no longer interested in receiving notifications, having for example gone offline, fails to deregister for the notifications. In such a situation, the CoAP client would remain on the list of observers for resources for which it has registered indefinitely. In order to avoid such a situation, the Observe mechanism requires that at least every 24 hours, a CoAP server should send a notification comprising an updated representation of a target resource in a confirmable message to all CoAP clients that have registered for updates about that resource. If a CoAP client does not respond to this confirmable message, the CoAP server should remove the CoAP client from the list of observers of the corresponding resource.

Although the CoAP Observe mechanism addresses a particular need that was not fulfilled by the original CoAP protocol, continuing evolution of IoT devices and deployments has resulting in additional needs for information management with respect to representations of CoAP resources. For example, some CoAP clients may sleep for periods longer than 24 hours, resulting in such clients being undesirable deregistered from resources. In addition, CoAP currently only allows for the provision of real-time current information about resources, which information may not be sufficient to fulfil the requirements of all CoAP clients.

SUMMARY

It is an aim of the present disclosure to provide a CoAP server, CoAP client, methods and computer readable medium which at least partially address one or more of the challenges discussed above.

According to a first aspect of the present disclosure, there is provided a Constrained Application Protocol (CoAP) client comprising processing circuitry that is configured to send to a CoAP server a request for information about a resource, the request for information comprising a time period option, wherein the time period option comprises a first time period value that indicates a period of time prior to the sending of the request for information over which information about the resource is requested. The processing circuitry is further configured to receive a response to the request for information.

According to another aspect of the present disclosure, there is provided a CoAP client comprising processing circuitry that is configured to send to a CoAP server a CoAP Observe registration relating to one or more resources, the CoAP Observe registration comprising an option, the option comprising a first value that indicates that the CoAP server should pause notifications for one or more registrations corresponding to one or more resources.

According to another aspect of the present disclosure, there is provided a CoAP server that is operable to provide information about at least one resource. The CoAP server comprises processing circuitry that is configured to receive from a CoAP client a request for information about a resource, the request for information comprising a time period option, wherein the time period option comprises a first time period value that indicates a period of time prior to the sending of the request over which information about the resource is requested. The processing circuitry is further configured to respond to the request for information.

According to another aspect of the present disclosure, there is provided a CoAP server that is operable to provide information about at least one resource. The CoAP server comprises processing circuitry that is configured to receive from a CoAP client a CoAP Observe registration relating to one or more resources, the CoAP Observe registration comprising an option, the option comprising a first value that indicates that the CoAP server should pause notifications for one or more registrations corresponding to the one or more resources. The processing circuitry is further configured to pause the one or more registrations.

According to another aspect of the present disclosure, there is provided a method performed by a CoAP client. The method comprises sending to a CoAP server a request for information about a resource, the request for information comprising a time period option, wherein the time period option comprises a first time period value that indicates a period of time prior to the sending of the request for information over which information about the resource is requested. The method further comprises receiving a response to the request for information.

According to another aspect of the present disclosure, there is provided a method performed by a CoAP client. The method comprises sending to a CoAP server a CoAP Observe registration relating to one or more resources, the CoAP Observe registration comprising an option, the option comprising a first value that indicates that the CoAP server should pause notifications for one or more registrations corresponding to one or more resources.

According to another aspect of the present disclosure, there is provided a method performed by a CoAP server that is operable to provide information about at least one resource. The method comprises receiving from a CoAP client a request for information about a resource, the request for information comprising a time period option, wherein the time period option comprises a first time period value that indicates a period of time prior to the sending of the request over which information about the resource is requested. The method further comprises responding to the request for information.

According to another aspect of the present disclosure, there is provided a method performed by a CoAP server that is operable to provide information about at least one resource. The method comprises receiving from a CoAP client a CoAP Observe registration relating to one or more resources, the CoAP Observe registration comprising an option, the option comprising a first value that indicates that the CoAP server should pause notifications for one or more registrations corresponding to the one or more resources. The method further comprises pausing the one or more registrations.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

An overview of CoAP server and CoAP client behaviour according to different examples of the present disclosure is provided below, together with discussion of details which may be incorporated in different implementations of these examples. There then follows a discussion of example methods according to the present disclosure, which methods may be implemented by processing circuitry in a CoAP server and CoAP client according to the present disclosure. Some example message sequences are then discussed illustrating operation of a CoAP server and CoAP client according to examples of the present disclosure. A CoAP server according to examples of the present disclosure is operable to provide information, such as representations, for one or more resources. A resource may for example be a data object or information, a service or application, a sensor etc.

Aspects of the present disclosure relate to enabling a CoAP client to request historical information about a resource from a CoAP server.

As currently specified, the CoAP Observe mechanism does not allow representations of a past state of a resource, that is a state in which the resource was prior to the receipt of an Observe registration, to be provided to a CoAP client. Thus, in other words it is not currently possible to obtain historical information relating to a resource. It is proposed that a new CoAP option may be provided to address this challenge. The option may be included in a request for information (such as an extended GET request or Observe registration, for example), and comprise a first time period value. The first time period value indicates a period of time prior to the sending of the request for information during which period of time information about a resource is requested. This option is referred to herein as the time period option.

Figure 2:
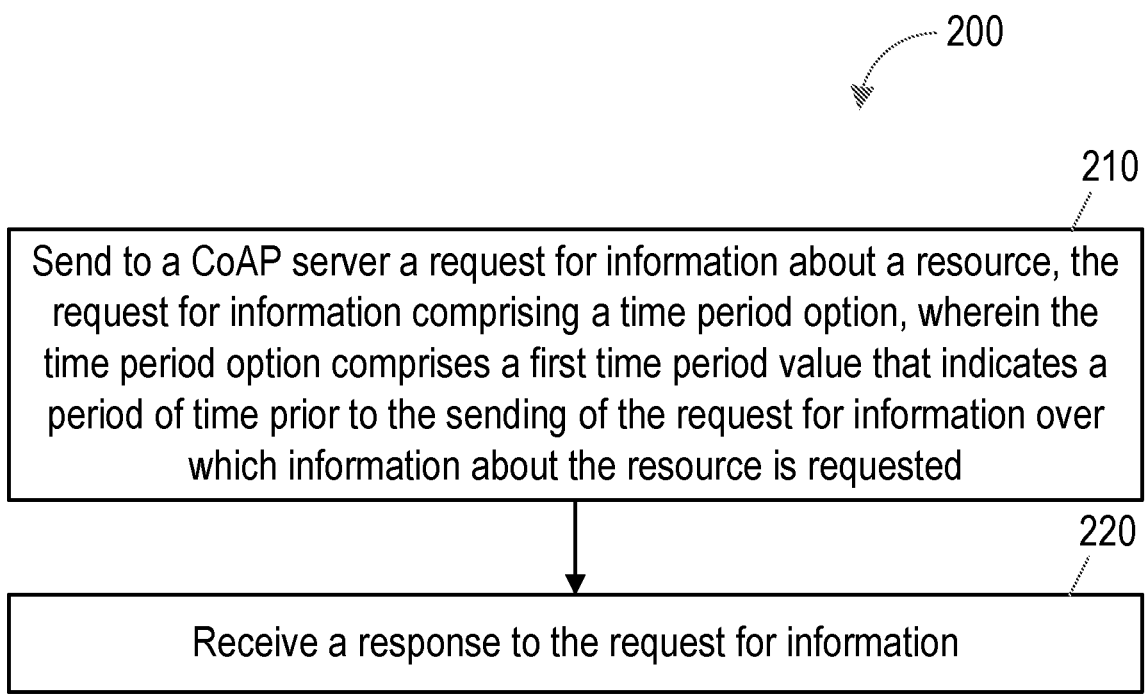
FIG. 2 is a flow chart illustrating a method performed by a CoAP client.

FIG. 2 is a flow chart illustrating a method 200 that may be conducted at a CoAP client, according to examples of the present disclosure.

Referring to FIG. 2, in a first step 210, a CoAP client sends to a CoAP server a request for information about a resource. The request for information comprises a time period option, wherein the time period option comprises a first time period value that indicates a period of time prior to the sending of the request for information, over which information about the resource is requested.

In some examples, the first time period value may indicate the beginning of the period of time prior to the sending of the request for information, over which information about the resource is requested. In some examples, the first time period value may comprise an integer value indicating the beginning of the period of time. The first time period value may for example comprise a value indicating a time in seconds prior to the sending of the request for information. For example, the time period value may be 86400, indicating that the period of time begins 86400 seconds (24 hours) prior to the sending of the request for information by the CoAP client. In other words, in this example, the CoAP client would be requesting information about a resource over the period of time that begins 86400 seconds (24 hours) prior to the sending of the request for information by the CoAP client, and ends at the time at which the request for information is sent by the CoAP client. Therefore, in some examples, the period of time ends at the time at which the request for information is sent. It will be appreciated that the first time period value may correspond to any suitable unit of time (for example, minutes, hours, days, etc.).

In another example, the first time period value may comprise a value indicating a date in seconds that exists prior to the sending of the request for information. In some examples, the date may be provided in Unix Epoch time. For example, the first time period value may be 1557409161, indicating that the period of time prior to the sending of the request for information begins at the Unix Epoch time 1557409161 (GMT May 9, 2019 1:39:21 PM). In other words, in this example, the CoAP client would be requesting information about a resource over the period of time that begins at the Unix Epoch time 1557409161, and ends at the time at which the request for information is sent by the CoAP client.

Therefore, in some examples, the period of time ends at the time at which the request for information is sent. It will be appreciated that the first time period value may represent a date in any suitable form.

In some examples, the first time period value may indicate the length of the period of time prior to the sending of the request for information over which information about a resource is requested. In some examples, the first time period value may be an integer value indicating the length of the period of time.

In some examples, the time period option may further comprise a second time period value that indicates the length of the period of time. The first period time value may indicate the beginning of the period of time according to any of the examples discussed above. Similarly, the second period time value may indicate the length of the period of time according to any of the examples discussed above.

For example, the first period time value may comprise a value indicating a date in seconds that exists prior to the sending of the request for information, as discussed above. The second time period value may be a value indicating a length of a time period in seconds, as discussed above. The first time period value and the second time period value may be separated by a token "+", although it will be appreciated that any suitable token may be used to separate the first and second time period values. For example, the first time period value may be 1557409161 in Unix Epoch time (GMT May 9, 2019 1:39:21 PM), and the second time period value may be 432000 seconds (120 hours). In other words, in this example, the CoAP client would be requesting information about a resource over the period of time that begins at 1557409161 in Unix Epoch time, and ends 432000 seconds (120 hours) after 1557409161 Unix Epoch time (GMT May 9, 2019 1:39:21 PM).

In some examples, the information about the resource that is requested may comprise at least one representation of the resource over the period of time. The resource may for example be a data object or information, a service or application, a sensor, a sensor reading etc., and the representation may be any appropriate representation able to convey a state of the resource.

In some examples, the request for information may further comprise a timestamp option, wherein the timestamp option comprises a first timestamp value. The first timestamp value may indicate that at least one timestamp corresponding to each of the at least one representations of the resource is requested. In other words, the timestamp option indicates whether timestamps should be provided for each representation of the resource that is requested.

In some examples, the information about the resource comprises at least one representation of the resource corresponding to a change of state of the resource within the period of time. For example, where the resource comprises a temperature value, if the temperature value changes from 22.9 degrees Celsius to 22.8 degrees Celsius during the period of time, the information about the resource will comprise the value 22.8 degrees Celsius.

In some examples, the information about the resource comprises at least one representation of the resource corresponding to the resource fulfilling at least one predetermined criterion within the period of time. For example, where the resource comprises a temperature value, and the predetermined criterion comprises a temperature value that is below 22.9 degrees Celsius, if the temperature value changes from 22.9 degrees Celsius to 22.8 degrees Celsius during the period of time, the information about the resource may comprise the value 22.8 degrees Celsius. It will be appreciated that a change of state of the resource may comprise the resource fulfilling at least one predetermined criterion. In other examples, resource may comprise a qualitative indication of temperature, and the criterion may be associated with a label, such that, for example, a temperature below 22.9 degrees Celsius is labelled as "low". In such examples, if the temperature value changes from 22.9 degrees Celsius to 22.8 degrees Celsius during the period of time, the information about the resource may comprise the label "low".

In step 220, the CoAP client receives a response to the request for information. The response to the request for information may comprise some, all or none of the additional features discussed below with reference to FIG. 6 and later in the detailed description.

Figure 3:
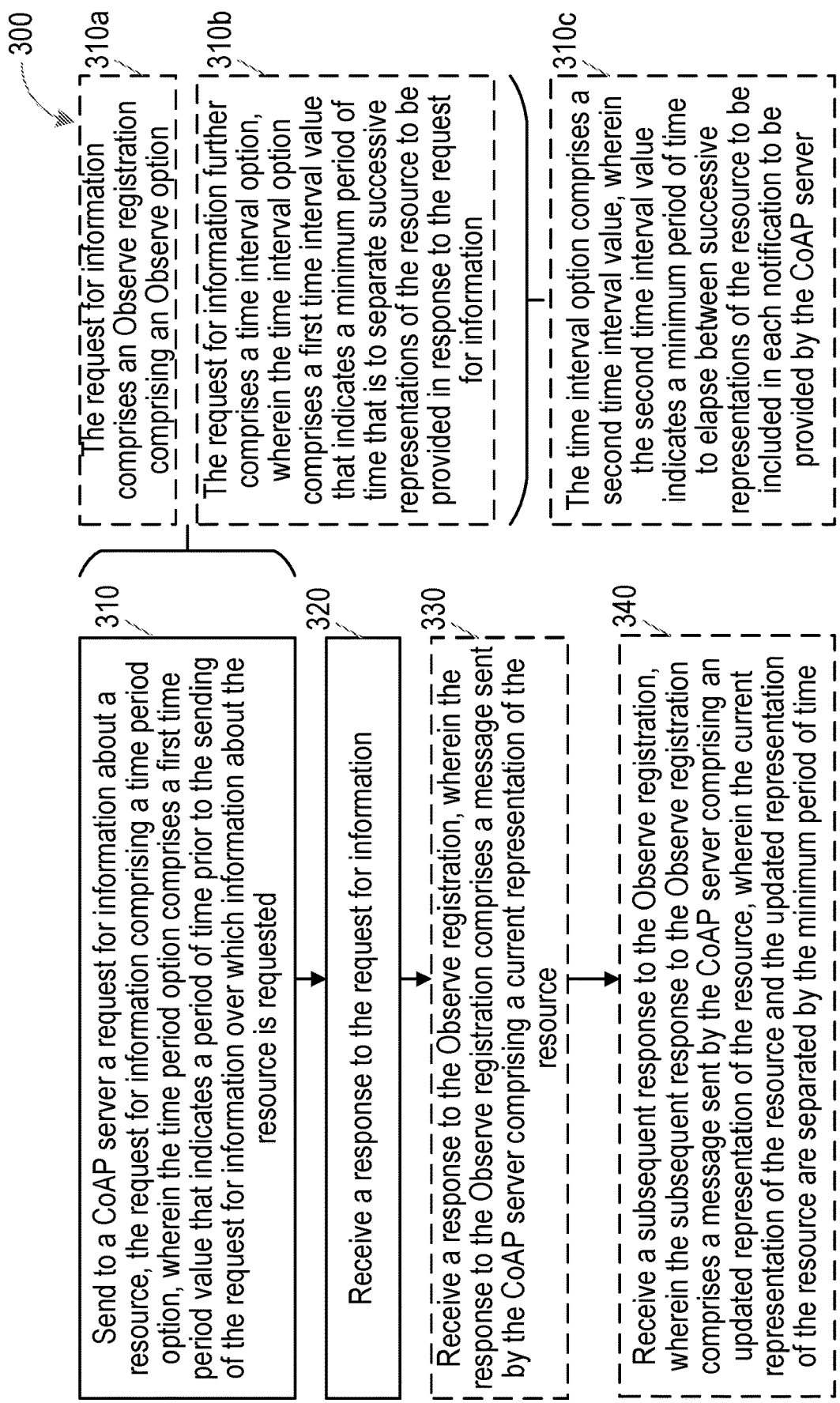
FIG. 3 is a flow chart illustrating another example of method performed by a CoAP client.

FIG. 3 shows a flow chart illustrating process steps in a further example of a method 300 by a CoAP client. The steps of the method 300 illustrate example ways in which the steps of the method 200 may be implemented and supplemented in order to achieve the above discussed and additional functionality.

In a first step 310, a CoAP client sends to a CoAP server a request for information about a resource, the request for information comprising a time period option, wherein the time period option comprises a first time period value that indicates a period of time prior to the sending of the request for information over which information about the resource is requested. According to different examples of the method 300, the information about the resource, the time period option, and the first time period value, may comprise some, all or none of the additional features discussed above with reference to FIG. 2 and earlier in the detailed description.

As illustrated in step 310b, the request for information may further comprise a time interval option, wherein the time interval option comprises a first time interval value that indicates a minimum period of time that is to separate successive representations of the resource to be provided in response to the request for information. In some circumstances, it may be that information relating to a resource changes very frequently during the period of time. In such circumstances, the CoAP client may seek to limit in some manner the amount of information provided by the CoAP server in response to the request for information. This may be appropriate owing to storage limitations in the CoAP server, or to reduce the length of a message that will be required to be communicated by the CoAP server to the CoAP client. In some examples, this limitation may be achieved by including another new option in the request for information. This further new option is referred to herein as a time interval option. The time interval option comprises a first time interval value that indicates a minimum period of time that is to separate successive representations of the resource to be provided in response to the request for information. In other words, in this example, the CoAP client defines a minimum interval that is to exist between successive representations of the resource to be provided by the CoAP server. In this manner, even if there are many representations of the resource that have been obtained by the CoAP server in the period of time (for example, due to the resource changing state frequently, or due to the resource meeting a predetermined criteria on multiple occasions, etc.), the CoAP client will only receive a subset of these representations each representation being separated in time from its preceding and subsequent representation by at least the minimum interval defined in the time interval option. In one example, if a minimum time interval of 2 hours is specified, and the subject resource changed state within the time period at times of 12:00, 12:30, 12:40, 13:20, 13:50 and 14:20, only the representations corresponding to the times 12:00 and 14:20 would be provided by the CoAP server in the response to the request for information. This option may be beneficial in situations where the CoAP client does not require every representation of a resource over an extended period of time. This may also be beneficial in reducing the size of the message that is communicated to the CoAP client by the CoAP server.

In some examples, the first time interval value indicate a minimum period of time in seconds that is to separate successive representations of a resource to be provided in response to a request for information. For example, the first time interval value may comprise the value 30, which in this example indicates that successive representations of the resource to be provided in response to the request for information should be separated by at least 30 seconds. It will be appreciated that the first time interval value may comprise any value, and that the time interval values correspond to any suitable unit of time.

Figure 1:
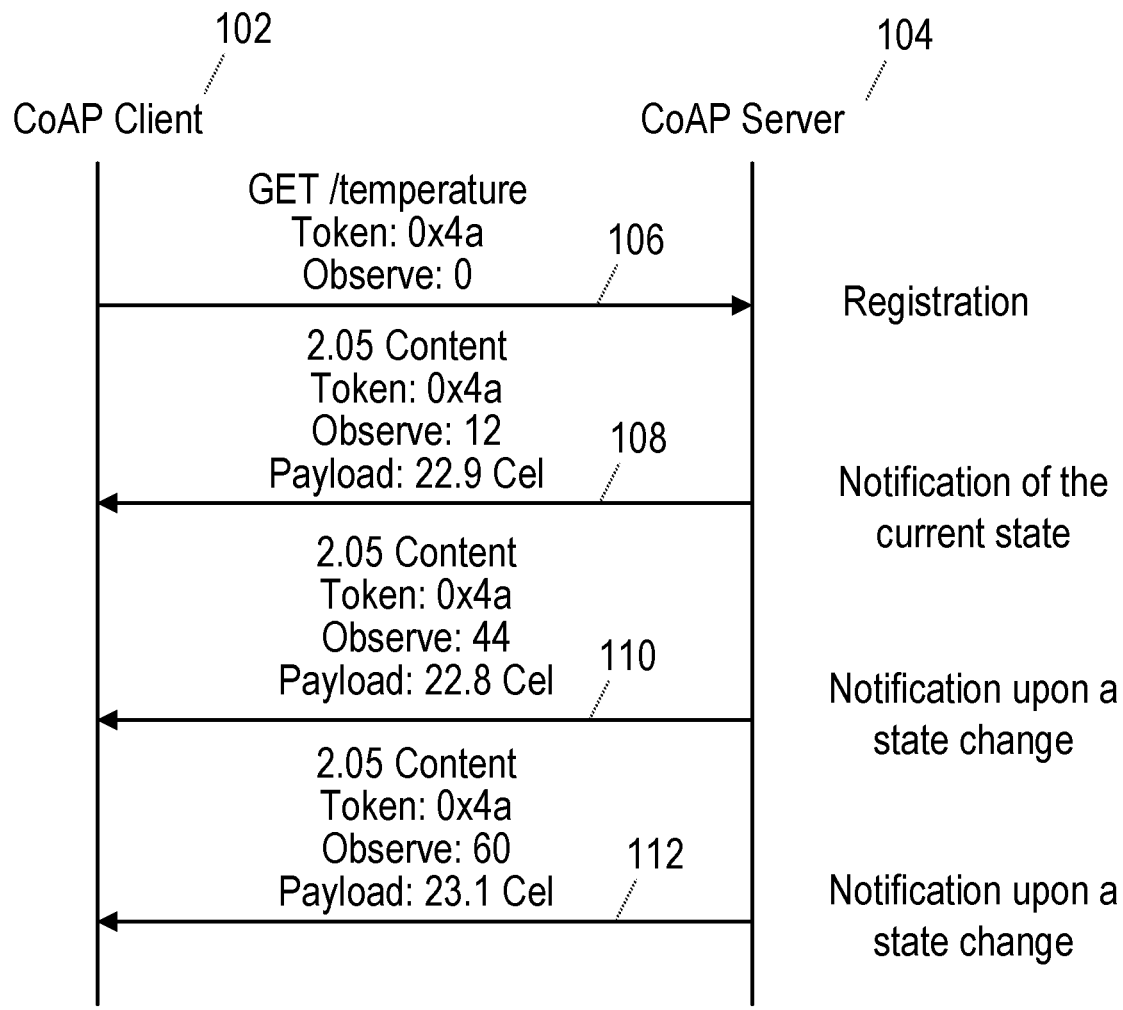
FIG. 1 is a message flow diagram illustrating example exchanges between a CoAP client and a CoAP server.

As illustrated in step 310*a*, the request for information may comprise an Observe registration comprising an Observe option. The Observe registration may be as described above in relation to FIG. 1. The inclusion of a request for information with an Observe registration may allow a CoAP client to indicate that it wishes to receive the current state of the resource, and notifications of how that resource will change in the future, as well as simultaneously requesting information relating to that resource in a past or historical time period, that is a time period prior to the sending of the Observe registration. This may allow for a reduction in the number of messages to be communicated by the CoAP client, and may reduce the power consumed by the CoAP client.

As illustrated in step 310*c*, the time interval option may comprise a second time interval value, wherein the second time interval value indicates a minimum period of time to elapse between notifications to be provided by the CoAP server in response to the Observe registration. In other words, in this example, in addition to specifying a temporal separation between representations of the resource in the historical data to be provided to the CoAP client, the CoAP client also defines a minimum period of time that is to exist between successive notifications to be provided by the CoAP server. In this manner, even if there are many more representations of the resource that have been obtained by the CoAP server in this minimum period of time (for example, due to the resource changing state, due to the resource meeting a predetermined criteria on multiple occasions, etc.), the CoAP client will only receive a subset of these representations, so reducing the load on the CoAP server and message traffic in what may be a constrained network. In one example, the CoAP client may specify a minimum interval of 10 seconds between representations in requested historical data, and specify that future notifications should be separated by a minimum of 5 seconds. According to such an example, even if the response changes state every 2 seconds, notifications will be sent at intervals of at least 5 seconds, and intervening representations will not be notified to the CoAP client.

In other words, the second time interval value may control the time separation of subsequent Observe notifications. For example, a CoAP server may wake up following a period of sleep, and may request representations of a resource from the last 24 hours that are separated by 2 hour intervals, and may also request that every hour from now onwards it receives a notification comprising the current representation of the resource. Thus, in this example, the first time period value will represent 24 hours, the first time interval value will represent 2 hours, and the second time interval value will represent 1 hour.

In step 320, the CoAP client receives a response to the request for information from the CoAP server. According to different examples of the method 300, the response to the request for information may comprise some, all or none of the additional features discussed below with reference to FIG. 6 and later in the detailed description. In some examples, the response to the request for information may be included in a response to an Observe registration at step 330, such that steps 320 and 330 are achieved by receiving a single message.

In step 330, the CoAP client receives a response to the Observe registration, wherein the response to the Observe registration comprises a message sent by the CoAP server comprising a current representation of the resource. The response may be as described above in relation to FIG. 1. In some examples, as discussed above, the response to the request for information at step 320, containing the historical information about the resource, and the response to the Observe registration at step 330, may be included in a single message received by the CoAP client.

In step 340, the CoAP client receives a subsequent response to the Observe registration, wherein the subsequent response to the Observe registration comprises a message sent by the CoAP server comprising an updated representation of the resource. In some examples, in which a minimum time period for separating notifications was included in the Observe registration as discussed above, the notification containing the updated representation of the resource may be separated from the response sent at step 330 by the minimum period of time as discussed above. The subsequent response may be as described above in relation to FIG. 1. For example, if the minimum period of time is 30 seconds, the subsequent response to the Observe registration may not be communicated by the CoAP server until at least 30 seconds after the earlier response to the Observe registration has been communicated.

Figure 4:
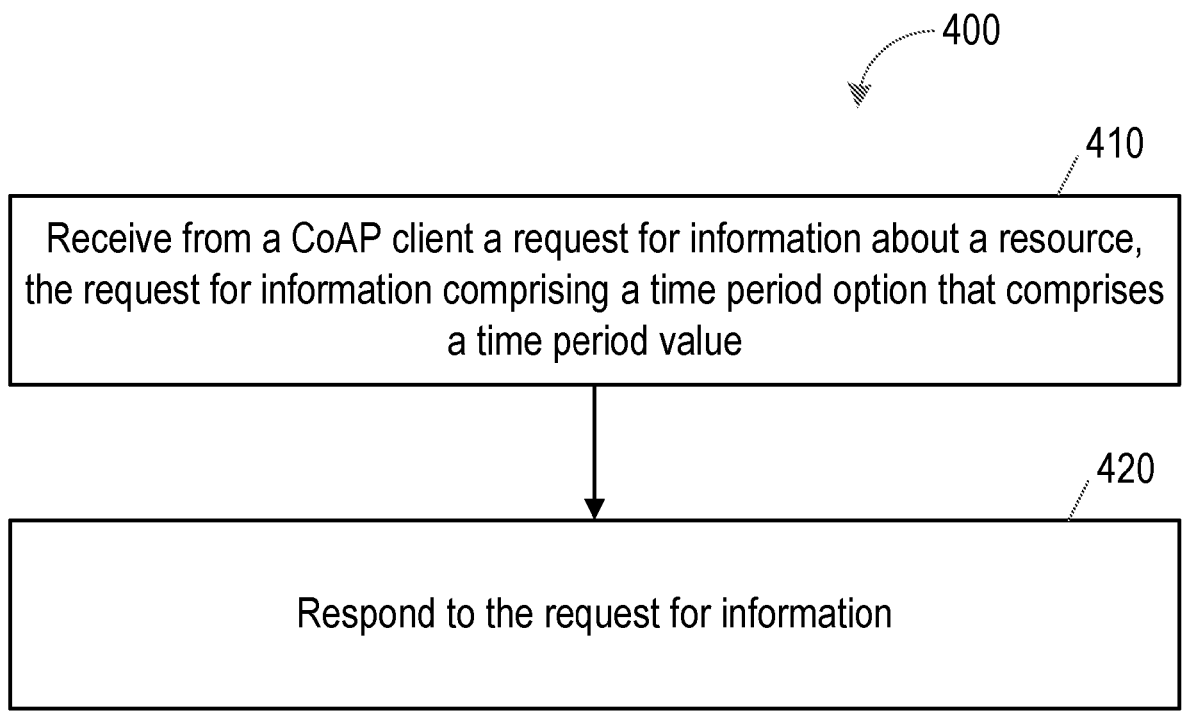
FIG. 4 is a flow chart illustrating a method performed by a CoAP server.

The steps of the methods 200 and 300 may be complimented by a method 400 performed by a CoAP server, as illustrated in FIG. 4.

In a first step 410, the CoAP server receives from a CoAP client a request for information about a resource, the request for information comprising a time period option that comprises a time period value. According to different examples of the method 400, the information about the resource, the time period option, and the time period value may comprise some, all or none of the additional features discussed above with reference to FIG. 2 and earlier in the detailed description.

In step 420, the CoAP server responds to the request for information. In some examples, the CoAP server is configured to respond to the request for information by sending a message to the CoAP client comprising information about the resource over the period of time. In some examples, the message may comprise at least one representation of the resource over the period of time, as discussed above. In some examples, the information about the resource over the period of time may further comprise a timestamp corresponding to each of the representations of the resource comprised within the message.

For example, the message may comprise at least one representation of the resource corresponding to a change of state of the resource within the period of time, as discussed above. In another example, the message may comprise at least one representation of the resource corresponding to the resource fulfilling at least one predetermined criterion within the period of time, as discussed above.

Figure 5A:
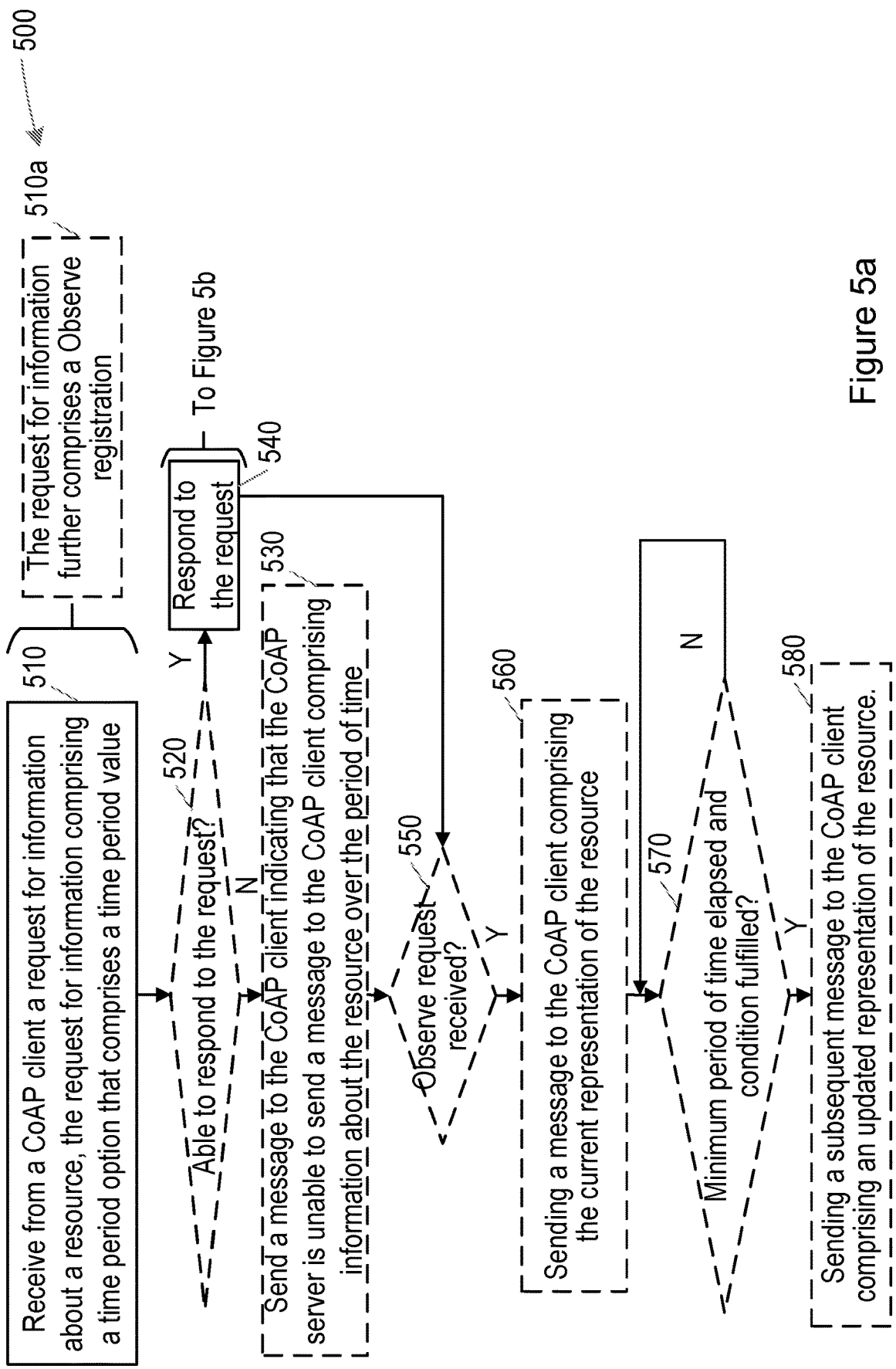
FIGS. 5a and 5b show a flow chart illustrating another example of a method performed by a CoAP server.
Figure 5B:
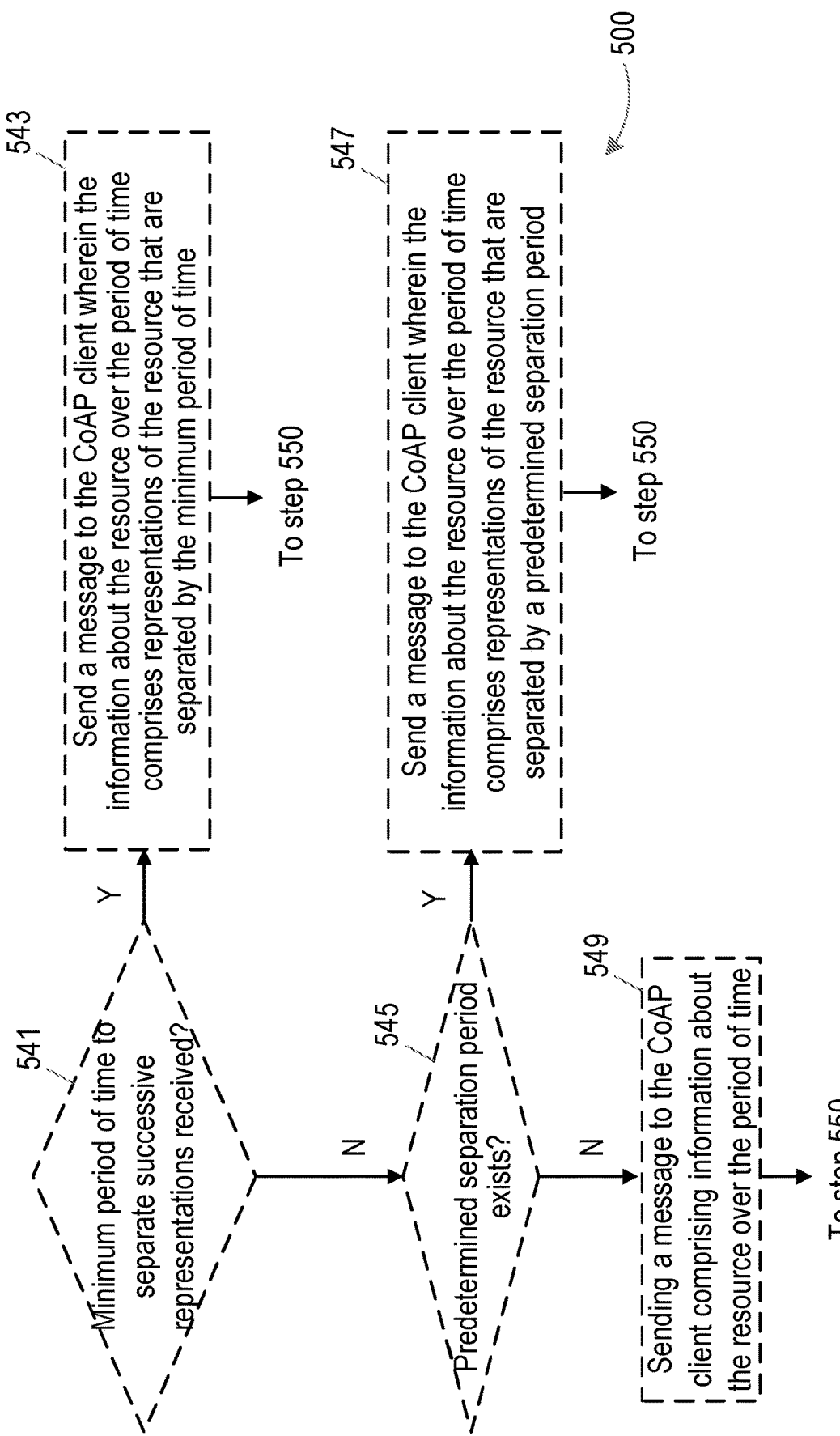

FIGS. 5*a* and 5*b* show flow charts illustrating process steps in a further example of a method 500 performed by a CoAP server. The steps of the method 500 illustrate example ways in which the steps of the methods 400 may be implemented and supplemented in order to achieve the above discussed and additional functionality.

In a first step 510, the CoAP server receives from a CoAP client a request for information about a resource, the request for information comprising a time period option that comprises a time period value. According to different examples of the method 500, the information about the resource, the time period option, and the time period value may comprise some, all or none of the additional features discussed above with reference to FIG. 2 and earlier in the detailed description.

As illustrated in step 510a, the request for information may comprise an Observe registration. According to different examples of the method 500, the Observe registration may comprise some, all or none of the additional features discussed above with reference to FIG. 1 and earlier in the detailed description.

At step 520, the CoAP server determines whether it is able to respond to the received request for information. If it is determined that the CoAP server cannot respond to the request for information, the process moves to step 530. If it is determined that the CoAP server can respond to the request for information, the process moves to step 540. The different steps that may be carried out to respond to the request for information are illustrated in FIG. 5b.

Referring now to FIG. 5b, at step 541, the CoAP server determines whether a minimum period of time to separate successive representations of the resource in the response to the request for information has been received. If it is determined that a minimum period of time has been received, the process moves to step 543. At step 543, the CoAP server sends a message to the CoAP client wherein the information about the resource over the period of time comprises representations of the resource that are separated by the minimum period of time.

If it is determined that a minimum period of time has not been received, the process moves to step 545. At step 545, the CoAP server determines whether a predetermined separation period exists. If it is determined that a predetermined separation period exists, the process moves to step 547. At step 547, the CoAP server sends a message to the CoAP client wherein the information about the resource over the period of time comprises representations of the resource that are separated by a predetermined separation period. In other words, the CoAP server may provide a subset of the representations of the resource over the period of time, where this subset is based on the predetermined separation period. The predetermined separation period may not have been received in a request for information from a CoAP client, and may be a parameter that is stored by the CoAP server.

Therefore, in some embodiments, the CoAP server may provide a subset of the information about the resource over the period of time that is requested by the CoAP client. This subset may be based on internal policies of the CoAP server. In some examples, this may prevent the size of the CoAP response message from becoming excessively large, and additionally or alternatively, may prevent the CoAP client from being provided with unnecessary information about the resource (for example, if the resource has changed very frequently over the predetermined period of time). In this example, the response sent by the CoAP server may further comprise a 2.06 content filter code. This code indicates that the CoAP server can send part of the information requested by the CoAP client.

Alternatively, the response sent by the CoAP server may further comprise a 2.07 content incomplete code. This code indicates that the CoAP server cannot provide all the information requested by the CoAP client. This may occur if the CoAP server is a constrained device with limited capabilities to store information relating to a resource for extended period of time, and has not stored information about the resource over the complete time period requested by the CoAP client.

Alternatively, if it is determined by the CoAP server that a predetermined separation period does not exist at step 545, the process moves to step 549. At step 549, the CoAP server sends a message to the CoAP client comprising information about the resource over the period of time. According to different examples of the method 500, the information about the resource may comprise some, all or none of the additional features discussed above with reference to FIG. 2 and the relevant earlier description.

Thus, in some embodiments, the CoAP server may provide all of the information about the resource over the period of time that has been requested by the CoAP client. In this example, the response sent by the CoAP server may further comprise a 2.05 content response code, or alternatively, may comprise a 2.03 (valid) response code. These codes indicate that the CoAP server can provide all of the information about the resource over the period of time that has been requested by the CoAP client.

Referring again to FIG. 5a, if the CoAP server is unable to respond to the request then, at step 530, the CoAP server sends a message to the CoAP client indicating that the CoAP server is unable to send notification messages to the CoAP client comprising information about the resource over the period of time. For example, in some embodiments, the CoAP server may send a message to the CoAP client comprising a 4.04 not found code. Alternatively, if the CoAP server is not able to implement the time period option as described in the document, the CoAP server may communicate this to the CoAP client by sending a message to the CoAP client comprising a 4.05 method not allowed code.

At step 550, following sending of the messages at step 530 or 540, the CoAP server determines whether an Observe registration has been received. For example, the request for information may have been included in an Observe registration. If it is determined that an Observe registration has not been received, the process ends. If it is determined that an Observe registration has been received, the process moves to step 560. At step 560, the CoAP server sends a message to the CoAP client comprising the current representation of the resource. The process then moves to step 570. At step 570, the CoAP server determines if a condition for sending an updated representation of the resource has been fulfilled, and if a minimum period of time to elapse between sending by the CoAP server of successive notifications about the resource has elapsed. In some embodiments, the condition may have been received in the Observe registration from the CoAP client, or may be based on the internal policies of the CoAP server. In some embodiments, the minimum period of time may have been received in the Observe registration, for example, as the second time interval value, as described above. Additionally or alternatively, in some embodiments, the minimum period of time to elapse may have been received in the Observe registration from the CoAP client, or may be based on the internal policies of the CoAP server. If it is determined that either the condition for sending an updated representation of the resource has not been fulfilled, or that the minimum period of time has not elapsed, then the process shall return to step 570. If it is determined that both the condition for sending an updated representation of the resource has been fulfilled and that the minimum period of time has elapsed, the process moves to step 580.

At step 580, the CoAP server sends a subsequent Observe message to the CoAP client comprising an updated representation of the resource.

Thus, the methods 200 to 500 discussed above illustrate different ways in which a CoAP server and client may operate in order to communicate regarding historical information relating to a resource.

Further aspects of the present disclosure relate to enabling a CoAP client to pause the sending of notifications by a CoAP server relating to a resource that the CoAP client is observing.

As discussed above, the Observe mechanism requires that a CoAP server sends a notification comprising an updated representation of a target resource to a CoAP client in a confirmable message at least every 24 hours. If the CoAP client does not respond to this confirmable message, the CoAP server will remove the CoAP client from the list of observers of the corresponding resource. As noted above, many CoAP devices may implement sleeping patterns in order to conserve energy, owing to their constrained capabilities, and these sleeping patterns may comprise sleeping periods that exceed 24 hours. Furthermore, a CoAP client will not be made aware that it has been removed by the CoAP server from the list of observers of the corresponding resource, and may therefore not be aware that it is missing future CoAP notifications of the state of a resource. In addition, a CoAP client may be registered to multiple CoAP observations at the same CoAP server. It may therefore be cumbersome to deregister for each resource at the CoAP server each time the CoAP client goes to sleep, and to re-register for each resource on waking.

It is proposed that new Option values in an Observe registration may be considered to address this challenge. As discussed above, when the value of the Observe option is set to 0 in an Observe registration, the CoAP server adds the CoAP client to the list of observers of the resource. When the value of the Observe option is set to 1 in an Observe registration, the CoAP server removes the CoAP client from the list of observers of the resource. It is proposed that new values of the Observe option may be used to pause and resume notifications relating to a resource.

Figure 6:
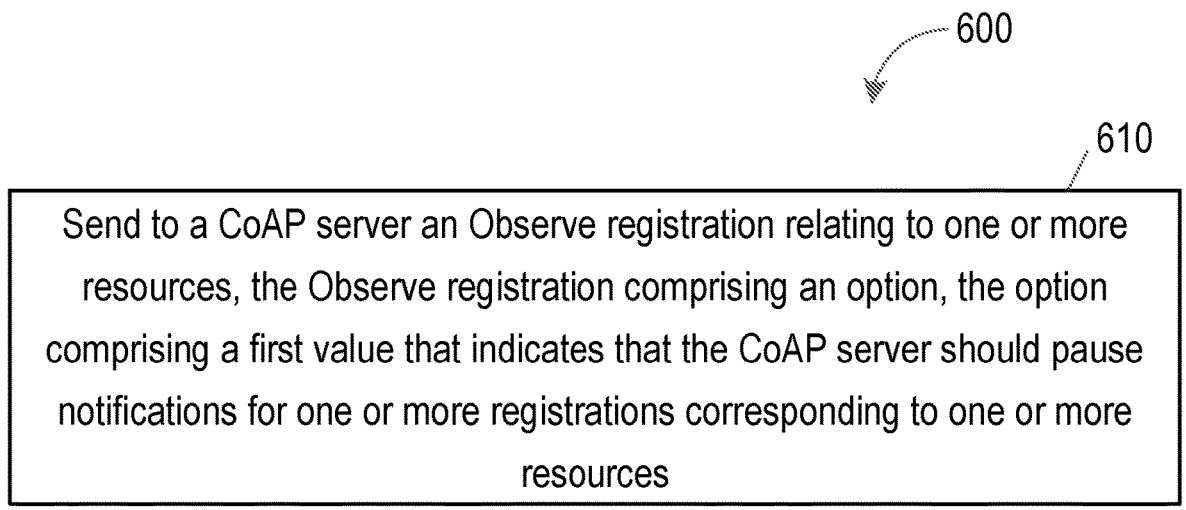
FIG. 6 is a flow chart illustrating a method performed by a CoAP client.

FIG. 6 is a flow chart illustrating a method 600 that may be conducted at a CoAP client, according to examples of the present disclosure.

In a first step 610, a CoAP client sends to a CoAP server an Observe registration relating to one or more resources, the Observe registration comprising an option, the option comprising a first value that indicates that the CoAP server should pause notifications for one or more registrations corresponding to one or more resources. In some examples, the option may be the Observe option and the first value may comprise the value 2 (as described in FIG. 12). When the CoAP server receives the option comprising the first value that indicates that the CoAP server should pause notifications for one or more registrations corresponding to one or more resources, the CoAP server will cease sending the CoAP client notifications for those one or more resources. However, the CoAP server will retain the CoAP client in the relevant lists of observers for those one or more resources. The relevant entry in the list may be identified by matching an endpoint or a token stored in the list with an endpoint or token received in a request for information from the CoAP client.

In some examples, the CoAP client is further configured to send to the CoAP server a subsequent Observe registration relating to one or more resources, the subsequent Observe registration comprising an option, the option comprising a second value that indicates that the CoAP server should resume paused notifications for one or more registrations. In some embodiments, the option may be the Observe option and the second value may comprise the value 3 (as described in FIG. 12). When the CoAP server receives the option comprising the second value that indicates that the CoAP server should resume paused notifications for one or more registrations, the CoAP server will resume sending the CoAP client notifications for those one or more registrations.

In some examples, where the Observe registration comprises an option comprising either the first value or the second value, the Observe registration may not further comprise a token option. In these cases, the Observe registration will either relate to pausing all notifications for the registrations that are registered at the CoAP server for that CoAP client (in the case that the option comprises the first value), or will relate to resuming paused notifications for all the registrations that are registered at the CoAP server for that CoAP client (in the case that the option comprises the second value). Additionally or alternatively, this may be indicated by an "/all" URL comprised within the Observe registration.

In some examples, where the Observe registration comprises an option comprising either the first value or the second value, the Observe registration may comprise a token. In these cases, the Observe registration will either relate to pausing or resuming notifications for the registration that corresponds to the token that is included in the Observe registration.

In other words, including (or not including) the token option in the Observe registration may provide the CoAP client with greater control over which notifications (that it is registered to receive from a CoAP server) it requests be paused or resumed.

Therefore, the CoAP client may use the above discussed method to prevent its registrations (each registration corresponding to a resource that the CoAP client is observing) from being cancelled at the relevant CoAP server. This may be useful when the CoAP client will be entering a sleeping period that exceeds 24 hours. Alternatively or additionally, if the CoAP client is able to pause the notifications relating to a registration at a time when the notifications are not required by the CoAP client, this may also reduce unnecessary traffic in a network. In other words, the above discussed method may contribute to the optimization of the throughput of a network, as IoT networks may be constrained, and thus the sending of unnecessary messages may negatively impact the throughput. Alternatively or additionally, if the CoAP client is able to pause the notifications relating to a registration at a time where the network is known to be unreliable, and the notifications being communicated by the CoAP server are at risk of not being received by the CoAP client, this may reduce uncertainty as to the validity of notifications received.

In some examples, the CoAP client may be further configured to send an Observe registration comprising an option that comprises either the first value or the second value as part of a multicasting message to the network. This allows the CoAP client to either pause, or to resume, one or more notifications at all the CoAP servers in the network. This may prevent the CoAP client from having to send an individual Observe registration (to either pause or resume notifications) to each of the CoAP servers in the network, and therefore may reduce traffic in the network.

In some examples, the CoAP client may also be configured to send to the CoAP server a request for information about a resource corresponding to at least one of the resumed registrations, wherein the request for information comprises a time period option, as discussed above. Additionally, the CoAP client may further be configured to receive a response to the request for information. In other words, the step of requesting that paused notifications for one or more registrations be resumed may be combined with the method of requesting historical information relating to the one or more registrations, as described above. This may be beneficial in a situation in which a CoAP client wishes to obtain information relating to a resource over the period of time during which the CoAP client requested that notification corresponding to that resource be paused (for example, over a period of time in which the CoAP client was sleeping, or at a time when the CoAP client requested notifications be paused due to network unreliability).

Figure 7:
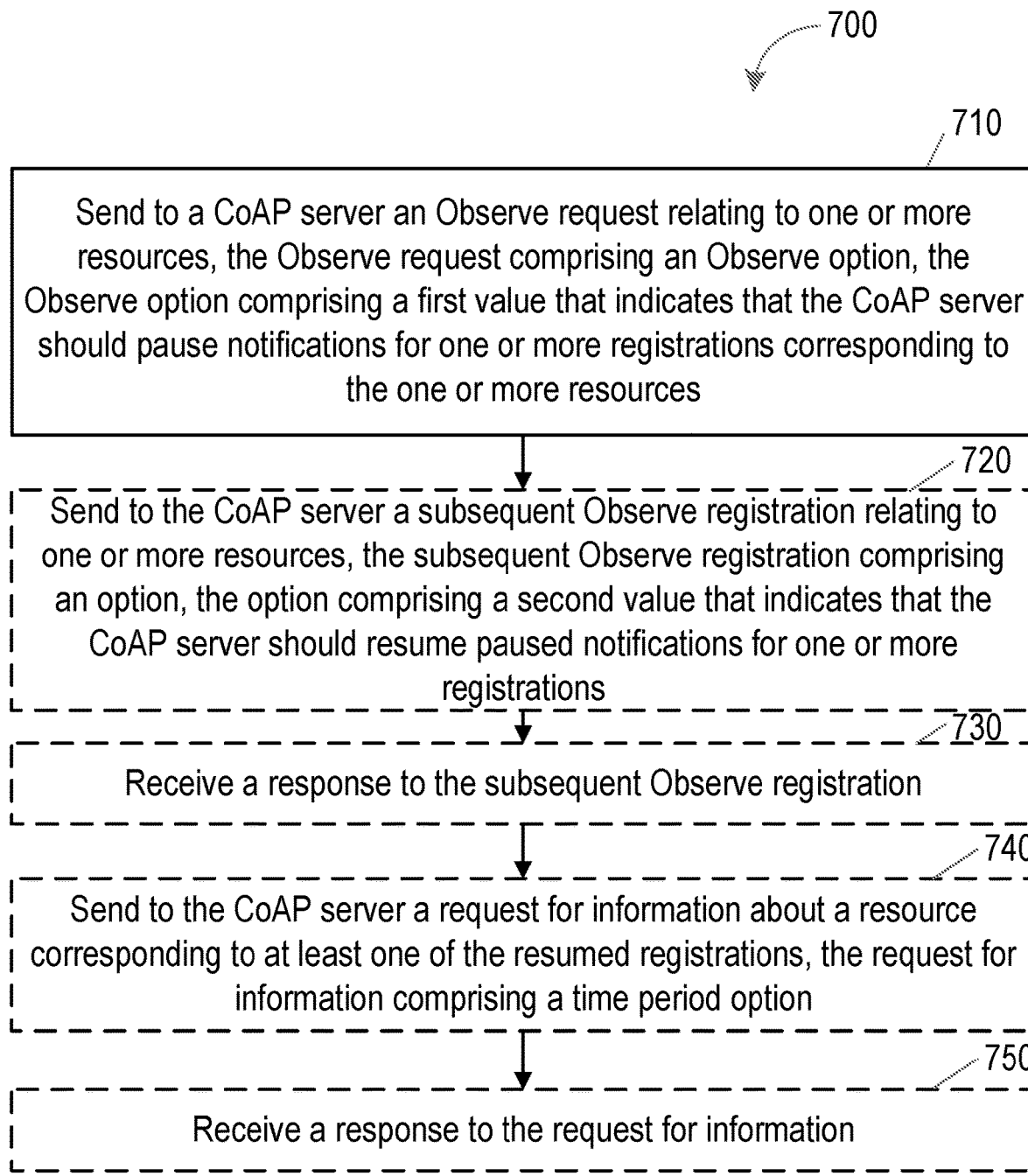
FIG. 7 is a flow chart illustrating another example of method performed by a CoAP client.

FIG. 7 shows a flow chart illustrating process steps in a further example of a method 700 performed by a CoAP client. The steps of the method 700 illustrate example ways in which the steps of the method 600 may be implemented and supplemented in order to achieve the above discussed and additional functionality.

In a first step 710, the CoAP client sends to a CoAP server an Observe registration relating to one or more resources, the Observe registration comprising an option, the option comprising a first value that indicates that the CoAP server should pause notifications for one or more registrations corresponding to one or more resources.

According to different examples of the method 700, the Observe registration may comprise some, all or none of the additional features discussed above with reference to FIG. 6 and earlier in the detailed description. The Observe registration may thus comprise an Observe option with a value of 2 (as described in FIG. 12).

At step 720, the CoAP client sends a subsequent Observe registration relating to one or more resources, the subsequent Observe registration comprising an option, the option comprising a second value that indicates that the CoAP server should resume paused notifications for one or more registrations. According to different examples of the method 700, the subsequent Observe registration may comprise some, all or none of the additional features discussed above with reference to FIG. 6 and earlier in the detailed description. The Observe registration may thus comprise an Observe option with a value of 3 (as described in FIG. 12).

At step 730, the CoAP client receives a response to the subsequent Observe registration from the CoAP server. According to different examples of the method 700, the response may comprise some, all or none of the additional features discussed above with reference to FIG. 6 and earlier in the detailed description.

At step 740, the CoAP client sends a request for information about a resource corresponding to at least one of the resumed registrations, the request for information comprising a time period option. According to different examples of the method 700, the request for information may comprise some, all or none of the additional features discussed above with reference to FIG. 2 and earlier in the detailed description.

At step 750, the CoAP client receives a response to the request for information from the CoAP server. According to different examples of the method 700, the request for information may comprise some, all or none of the additional features discussed above with reference to FIG. 2 and earlier in the detailed description. In some examples, the request for information sent at step 740 may be included in the subsequent Observe registration sent at step 720, for example be including the time period option on the subsequent Observe registration sent at step 720.

Figure 8:
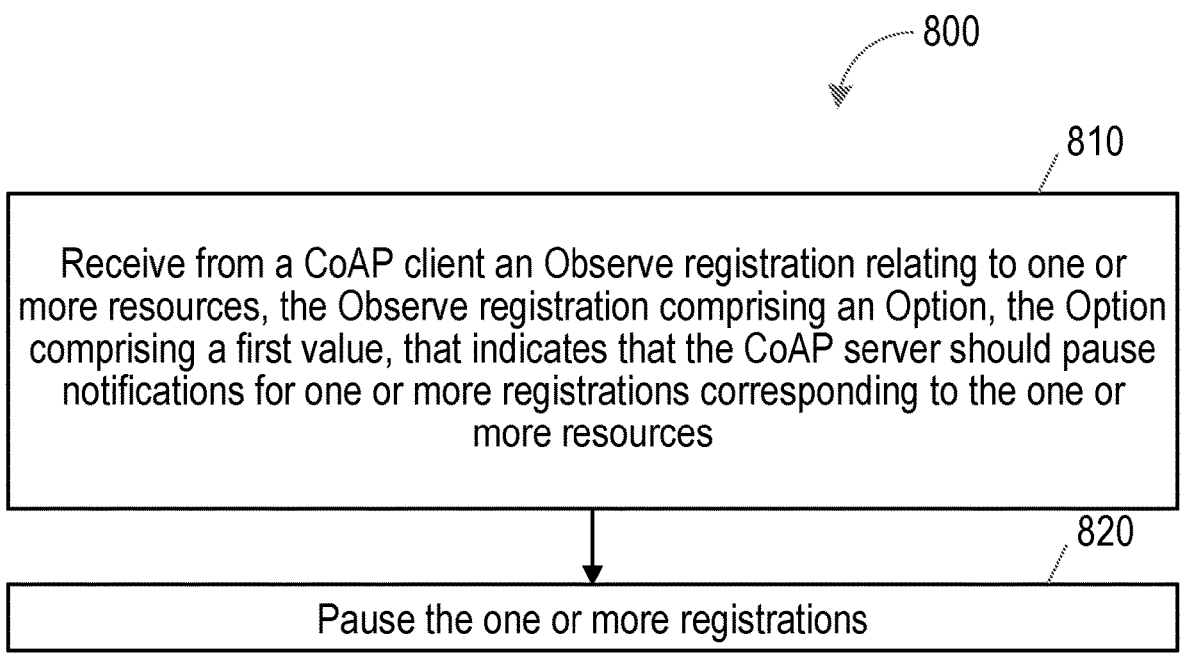
FIG. 8 is a flow chart illustrating a method performed by a CoAP server.

The steps of the methods 600 and 700 may be complimented by a method 800 performed by a CoAP server, as illustrated in FIG. 8.

Referring now to FIG. 8, in a first step 810, the CoAP server receives from a CoAP client an Observe registration relating to one or more resources, the Observe registration comprising a CoAP Option, the option comprising a first value that indicates that the CoAP server should pause notifications for one or more registrations corresponding to the one or more resources. According to different examples of the method 800, the Observe registration may comprise some, all or none of the additional features discussed above with reference to FIG. 6 and earlier in the detailed description.

At step 820, the CoAP server pauses the one or more registrations.

Figure 9A:
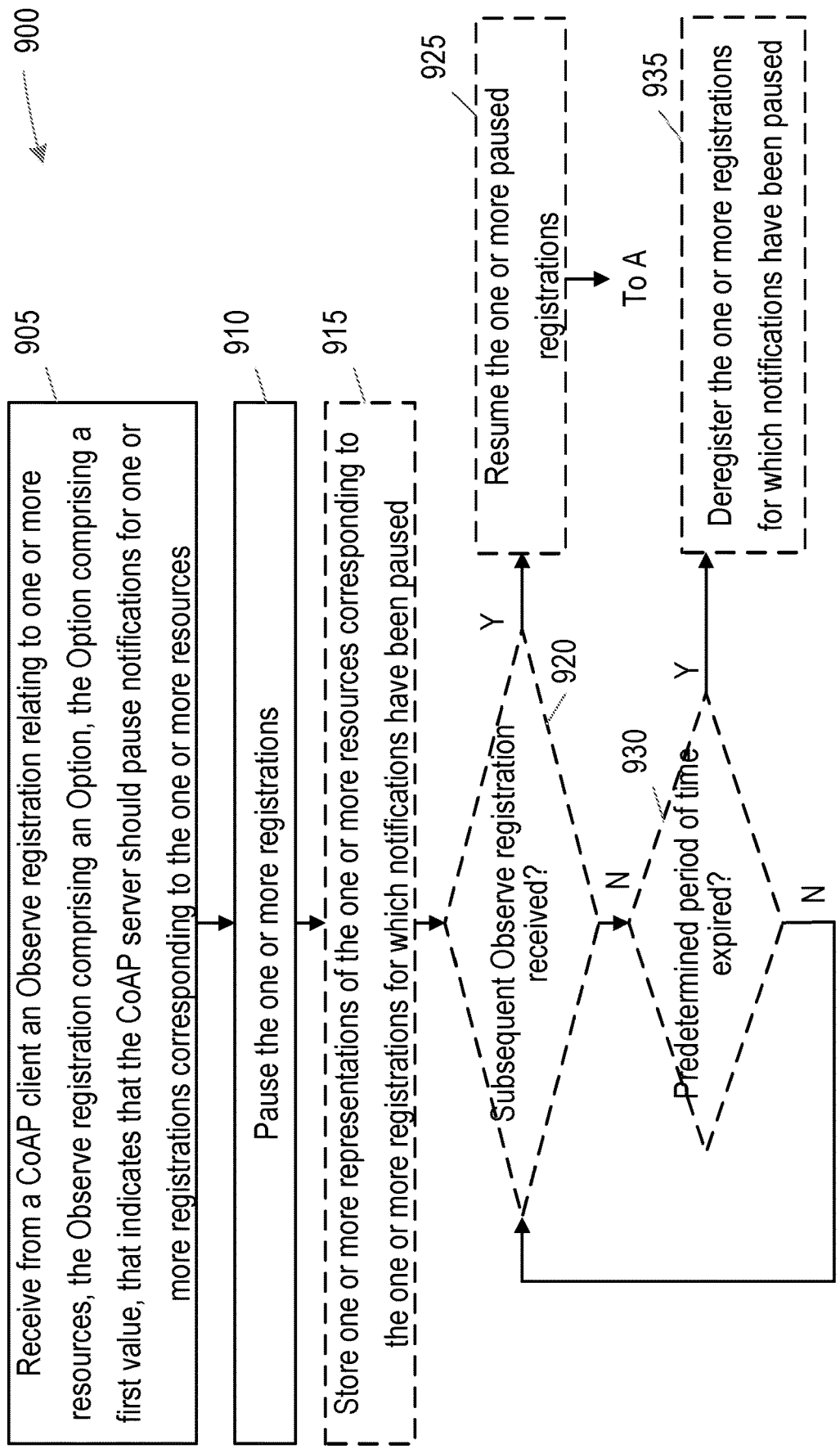
FIGS. 9a, 9b and 9c show a flow chart illustrating another example of a method performed by a CoAP server.
Figure 9B:
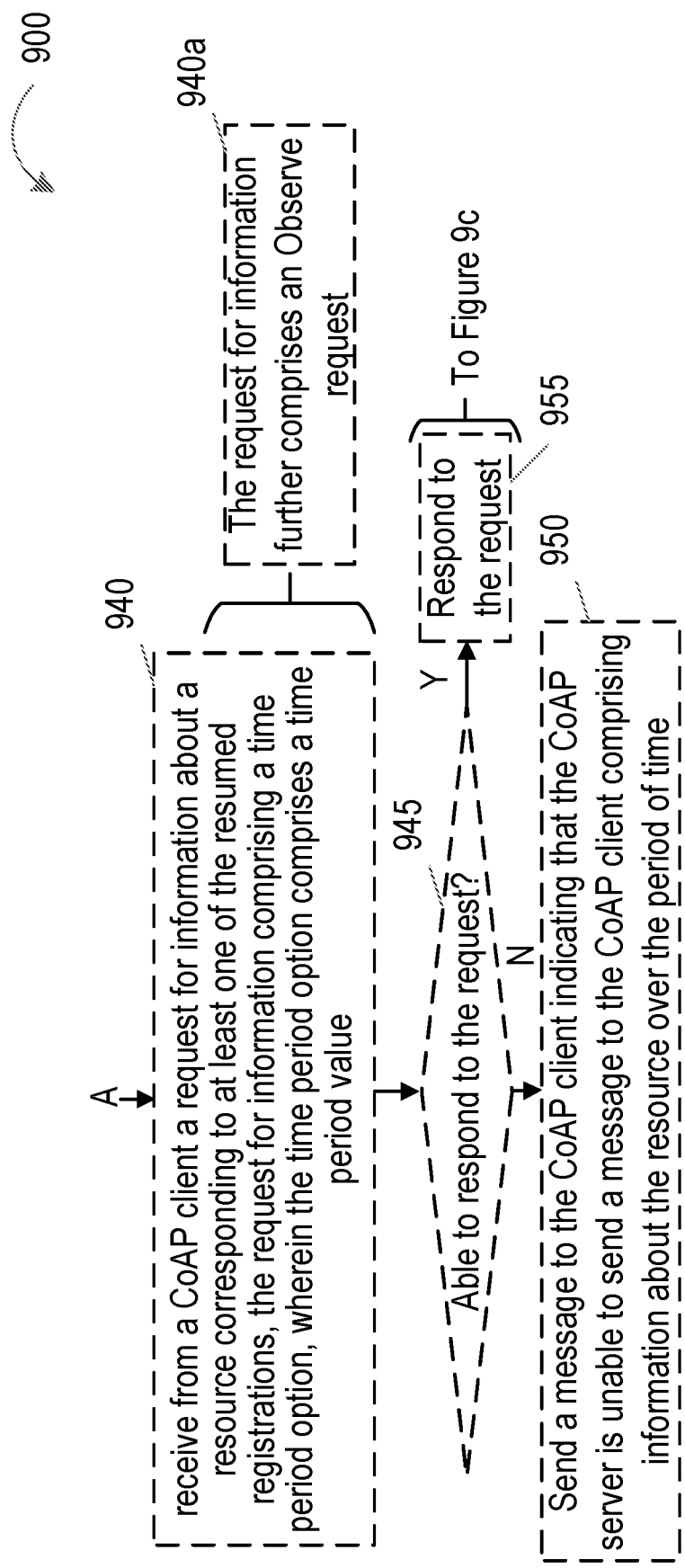
Figure 9C:
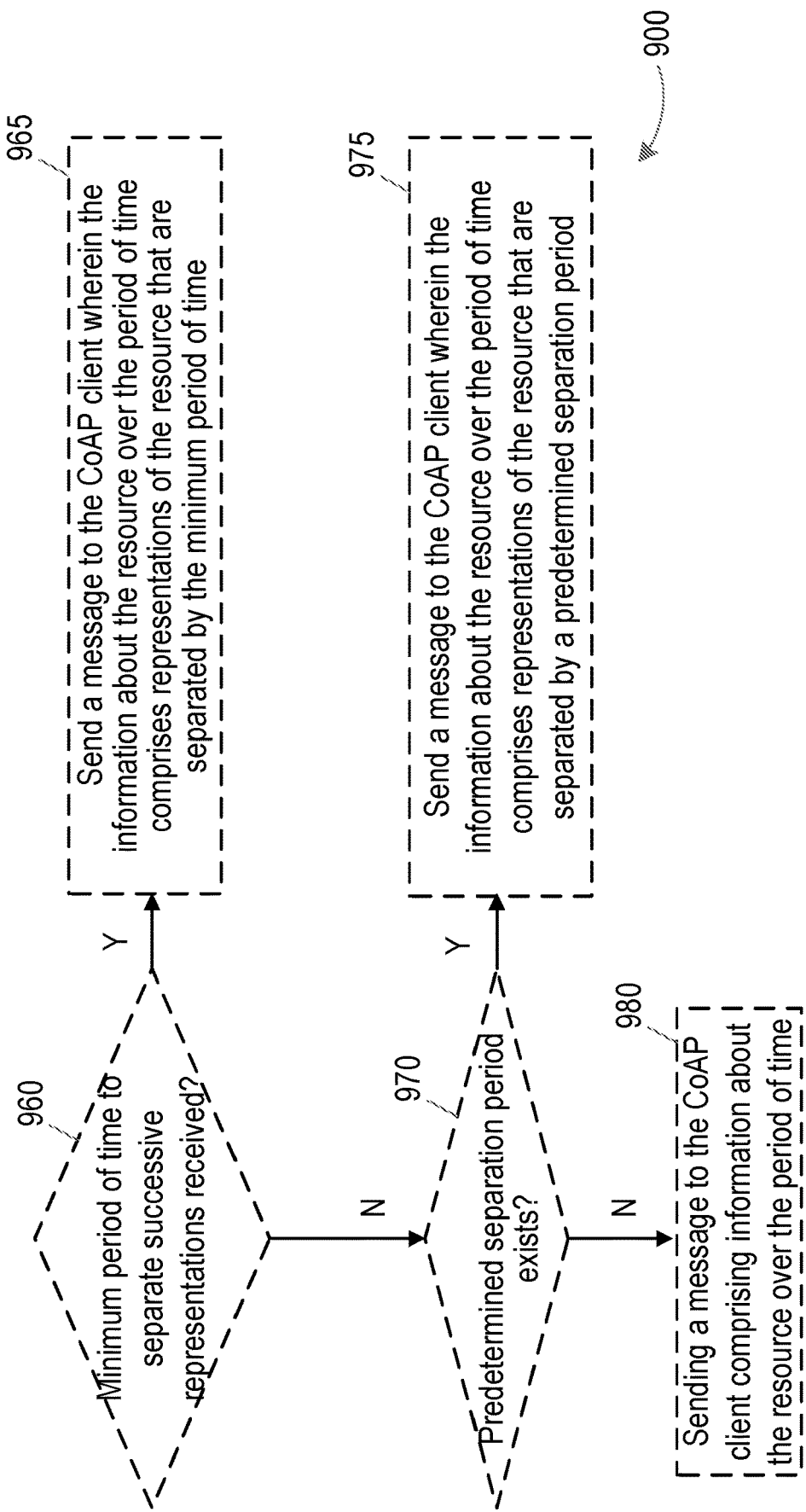

FIGS. 9*a* to 9*c* show a flow chart illustrating process steps in a further example of a method 900 performed by a CoAP server. The steps of the method 900 illustrate example ways in which the steps of the method 800 may be implemented and supplemented in order to achieve the above discussed and additional functionality.

Referring to FIG. 9*a*, in a first step 905, the CoAP server receives from a CoAP client an Observe registration relating to one or more resources, the Observe registration comprising an option, the option comprising a first value that indicates that the CoAP server should pause notifications for one or more registrations corresponding to the one or more resources. According to different examples of the method 900, the Observe registration may comprise some, all or none of the additional features discussed above with reference to FIG. 6 and earlier in the detailed description.

At step 910, the CoAP server pauses the one or more registrations.

At step 915, the CoAP server stores one or more representations of the one or more resources corresponding to the one or more registrations for which notifications have been paused. It will be appreciated that although retaining the representations of the one or more resources may not be possible for some CoAP servers due to their constrained capabilities, some CoAP servers may be able to retain the requested representations, or alternatively, can implement internal policies to limit the number of representations stored. Aspects of the present disclosure may, for example, be implemented on Class 2 devices (as per RFC 7228, ~50 KB of RAM and ~250 KB of ROM) or may be implemented in constrained devices with capabilities significantly beyond Class 2. In some examples, the CoAP server may store a notification state of a CoAP client for one or more registrations corresponding to the CoAP client. In other words, the CoAP server may store whether notifications have been paused, or not, for each registration at the CoAP server.

At steps 920 and 930, the CoAP server determines whether a subsequent Observe registration has been received prior to the expiry of a predetermined period of time. In some examples, the predetermined period of time begins at the receipt of the Observe registration indicating that the CoAP server should pause notifications for one or more registrations corresponding to the one or more resources. If it is determined that no subsequent observe registration has been received, the process moves to step 935. At step 935, the CoAP server deregisters the one or more registrations for which notifications have been paused. This may, for example, prevent a malicious third party from attacking a CoAP server by pausing the notifications at the CoAP server for a particular observation by a particular CoAP client. In these circumstances, the attacker would not resume the paused notifications, thus wasting the storage capabilities of the CoAP server. However, allowing the pausing of the notifications to timeout may prevent this from occurring. For example, the predetermined period of time to timeout may be 30 days, or any other suitable length of time.

If it is determined that a subsequent Observe registration relating to one or more resources has been received from the CoAP client, the CoAP server may restart a timer for the timeout of at least the paused notifications included in the subsequent Observe registration and the process moves to step 925. At step 925, the CoAP server resumes the one or more paused registrations indicated in the subsequent Observe registration.

Referring now to FIG. 9*b*, at step 940, the CoAP server receives a request for information about a resource corresponding to at least one of the resumed registrations, the request for information comprising a time period option, wherein the time period option comprises a time period value. According to different examples of the method 900, the information about the resource, the time period option, and the first time period value, may comprise some, all or none of the additional features discussed above with reference to FIG. 2 and earlier in the detailed description. As illustrated in step 940*a*, in some examples, the request for information may further comprise an Observe registration. According to different examples of the method 900, the Observe registration may comprise some, all or none of the additional features discussed above with reference to FIG. 1 and earlier in the detailed description At step 945, the CoAP server determines whether it is able to respond to the received request for information. If it is determined that the CoAP server cannot respond to the request for information, the process moves to step 950. If it is determined that the CoAP server can respond to the request for information, the process moves to step 955. The different steps that may be carried out to respond to the request for information are illustrated in FIG. 9*c*.

Referring now to FIG. 9*c*, at step 960, the CoAP server determines whether a minimum period of time to separate successive representations of the resource in the response to the request for information has been received. If it is determined that a minimum period of time has been received, the process moves to step 965. At step 965, the CoAP server may send a message to the CoAP client wherein the information about the resource over the period of time comprises representations of the resource that are separated by the minimum period of time.

If it is determined that a minimum period of time has not been received, the process moves to step 970. At step 970, the CoAP server determines whether a predetermined separation period exists. If it is determined that a predetermined separation period exists, the process moves to step 975. At step 975, the CoAP server may send a message to the CoAP client wherein the information about the resource over the period of time comprises representations of the resource that are separated by a predetermined separation period. In other words, the CoAP server may provide a subset of the representations of the resource over the period of time, where this subset is based on the predetermined separation period. The predetermined separation period may not have been received in a request for information from a CoAP client, and may be a parameter that is stored by the CoAP server.

Therefore, in some embodiments, the CoAP server may provide a subset of the information about the resource over the period of time that is requested by the CoAP client. This subset may be based on internal policies of the CoAP server. In some examples, this may prevent the size of the CoAP response message from becoming excessively large, and additionally or alternatively, may prevent the CoAP client from being provided with unnecessary information about the resource (for example, if the resource has changed very frequently over the predetermined period of time). In this example, the response sent by the CoAP server may further comprise a 2.06 content filter code. This code indicates that the CoAP server can send part of the information requested by the CoAP client.

Alternatively, the response sent by the CoAP server may further comprise a 2.07 content incomplete code. This code indicates that the CoAP server cannot provide all the information requested by the CoAP client. This may occur if the CoAP server is a constrained device with limited capabilities to store information relating to a resource for extended period of time, and has been unable to store representations of the resource for the full time period specified.

If it is determined that a predetermined separation period does not exist, the process moves to step 980. At step 980, the CoAP server sends a message to the CoAP client comprising information about the resource over the period of time. According to different examples of the method 900, the information about the resource may comprise some, all or none of the additional features discussed above with reference to FIG. 2.

Thus, in some embodiments, the CoAP server may provide all of the information about the resource over the period of time that is requested by the CoAP client. In this example, the response sent by the CoAP server may further comprise a 2.05 content response code, or alternatively, may comprise a 2.03 (valid) response code. These codes indicate that the CoAP server can provide all of the information about the resource over the period of time that is requested by the CoAP client.

Referring again to FIG. 9*b*, at step 950, if the CoAP server is unable to respond to the request, the CoAP server sends a message to the CoAP client indicating that the CoAP server is unable to send a message to the CoAP client comprising information about the resource over the period of time. For example, in some examples, the CoAP server may send a message to the CoAP client comprising a 4.04 not found code. Alternatively, if the CoAP server is not able to implement the time period option as described in the document, the CoAP server may communicate this to the CoAP client by sending a message to the CoAP client comprising a 4.05 method not allowed code.

The methods 200 and 300, and 400 and 500 discussed above illustrate different ways in which a CoAP server and client may operate in order to enable a CoAP client to request historical information from a CoAP server.

The methods 600 and 700, and 800 and 900 discussed above illustrate different ways in which a CoAP server and client may operate in order to enable a CoAP client to pause the sending of notifications by a CoAP server relating to a resource that the CoAP client is observing.

FIGS. 10, 11, 12 and 13 are message flow diagrams illustrating example exchanges between a CoAP client and server according to different examples of the methods discussed above.

Figure 10:
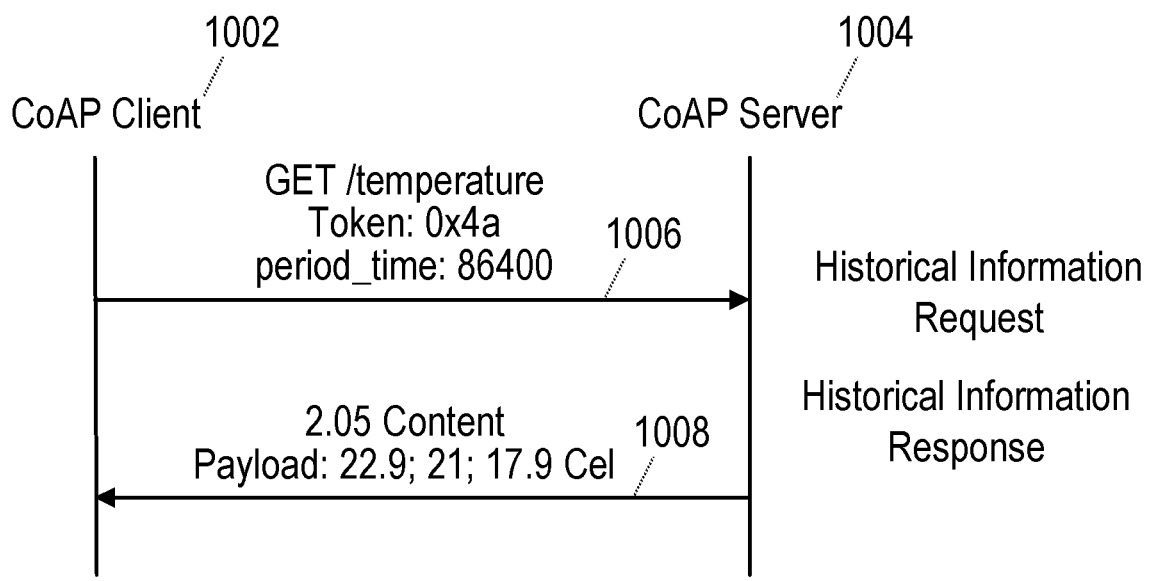
FIGS. 10, 11, 12 and 13 are message flow diagrams illustrating example exchanges between a CoAP client and a CoAP server.

In the example message exchange of FIG. 10 between a CoAP client 1002 and a CoAP server 1004, in step 1006, the CoAP client 1002 sends a request for information about a resource, the request for information comprising a time period option, wherein the time period option comprises a first time period value that indicates a period of time prior to the sending of the request for information over which information about the resource is requested. In this illustrated example, the request for information comprises a CoAP GET request, and the resource comprises a temperature resource. The request further comprises a token that has been specified by the CoAP client 1002, wherein the value of the token is 0x4a. The first time period value comprises 86400, which in this example indicates that the period of time prior to the sending of the request for information begins 86400 seconds (24 hours) prior to the sending of the request for information by the CoAP client 1002. It will be appreciated that the request for information sent by the CoAP client 1002 at step 1006 may be considered a historical information request.

At step 1008, the CoAP server 1004 responds to the request for information. In this example, the CoAP server 1004 sends a message to the CoAP client 1002 comprising information about the resource over the period of time, wherein the message comprises at least one representation of the resource over the period of time. In this example, the message comprises the values 22.9, 21 and 17.9 in the payload, corresponding to three distinct representations of the temperature resource of 22.9 degrees Celsius, 21 degrees Celsius and 17.9 degrees Celsius. As, in this example, all the values are in Celsius, the CoAP server 1004 only indicates the Celsius value as part of the last representation to simplify the message. In this example, although the different representations of the resource are separated by semicolons, it will be appreciated that any other appropriate symbols, or any other appropriate method of separating values in the payload may be used. For example, different representations of the resource may be separated by a carriage return ("\r"). It will be appreciated that the representations of the resource within the payload may be in chronological order.

In this example, the message further comprises a 2.05 content code. It will be appreciated that the request for information sent by the CoAP sever 1004 at step 1008 may be considered a historical information response.

Figure 11:
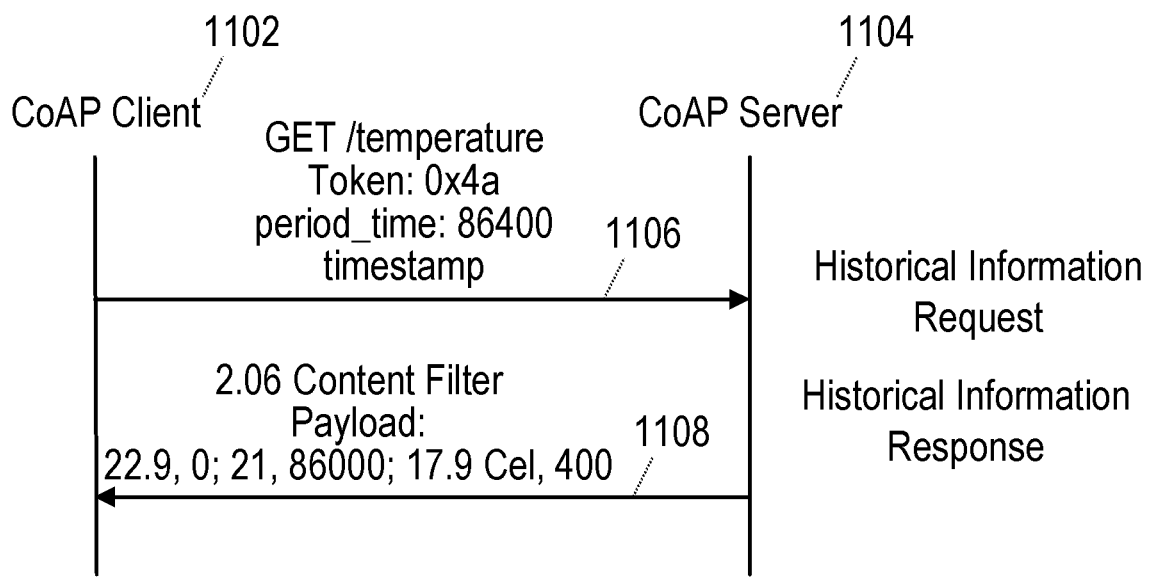

In the example message exchange of FIG. 11 between a CoAP client 1102 and a CoAP server 1104, in step 1106, the CoAP client 1102 sends a request for information about a resource, the request for information comprising a time period option, wherein the time period option comprises a first time period value that indicates a period of time prior to the sending of the request for information over which information about the resource is requested. In this illustrated example, the request for information comprises a CoAP GET request, and the resource comprises a temperature resource. The request further comprises a token that has been specified by the CoAP client 1102, wherein the value of the token is 0x4a. The first time period value comprises 86400, which in this example indicates that the period of time prior to the sending of the request for information begins 86400 seconds (24 hours) prior to the sending of the request for information by the CoAP client 1102. In this illustrated example, the request for information further comprises a timestamp option, wherein the timestamp option comprises a first timestamp value, wherein the first timestamp value indicates that at least one timestamp corresponding to each of the at least one representation of the resource is requested. It will be appreciated that the request for information sent by the CoAP client 1102 at step 1106 may be considered a historical information request.

At step 1108, the CoAP server 1104 responds to the request for information. In this example, the CoAP server 1104 sends a message to the CoAP client 1102 comprising information about the resource over the period of time, wherein the message comprises at least one representation of the resource over the period of time. In this example, the message comprises a first entry—the value 22.9 and the timestamp 0, a second entry—the value 21 and the timestamp 86000, and a third entry—the value 17.9 and the timestamp 400, in the payload. For each of the three entries, the value of the resource and the timestamp are separated by a comma, and each of the entries are separated from one another by semicolons. However, it will be appreciated that any other appropriate symbols, or any other appropriate method of separating entries in the payload, and of separating parameters within entries, may be used. As, in this example, all the values of the resource are in Celsius, the CoAP server 1104 only indicates the Celsius value as part of the last representation to simplify the message. In this example, each timestamp represents the time in seconds from each previous state change of the resource. Thus, in this example, the value of the resource was 22.9 degrees Celsius at the beginning of the period of time (at 0 seconds), the value of the resource was then 21 degrees Celsius 86000 seconds after the time corresponding to the first value of the resource (86000 seconds into the period of time), and the value of the resource was then 17.9 degrees Celsius 400 seconds after the time corresponding to the second value of the resource (86400 seconds into the period of time). In this example, the message further comprises a 2.06 content filter response code, which indicates that the CoAP server 1104 has sent only part of the information requested by the CoAP client 1102. For example, the CoAP server 1104 may have filtered the information requested by the CoAP client 1102 in one of the manners as discussed above. It will be appreciated that the request for information sent by the CoAP sever 1104 at step 1108 may be considered a historical information response.

Figure 12:
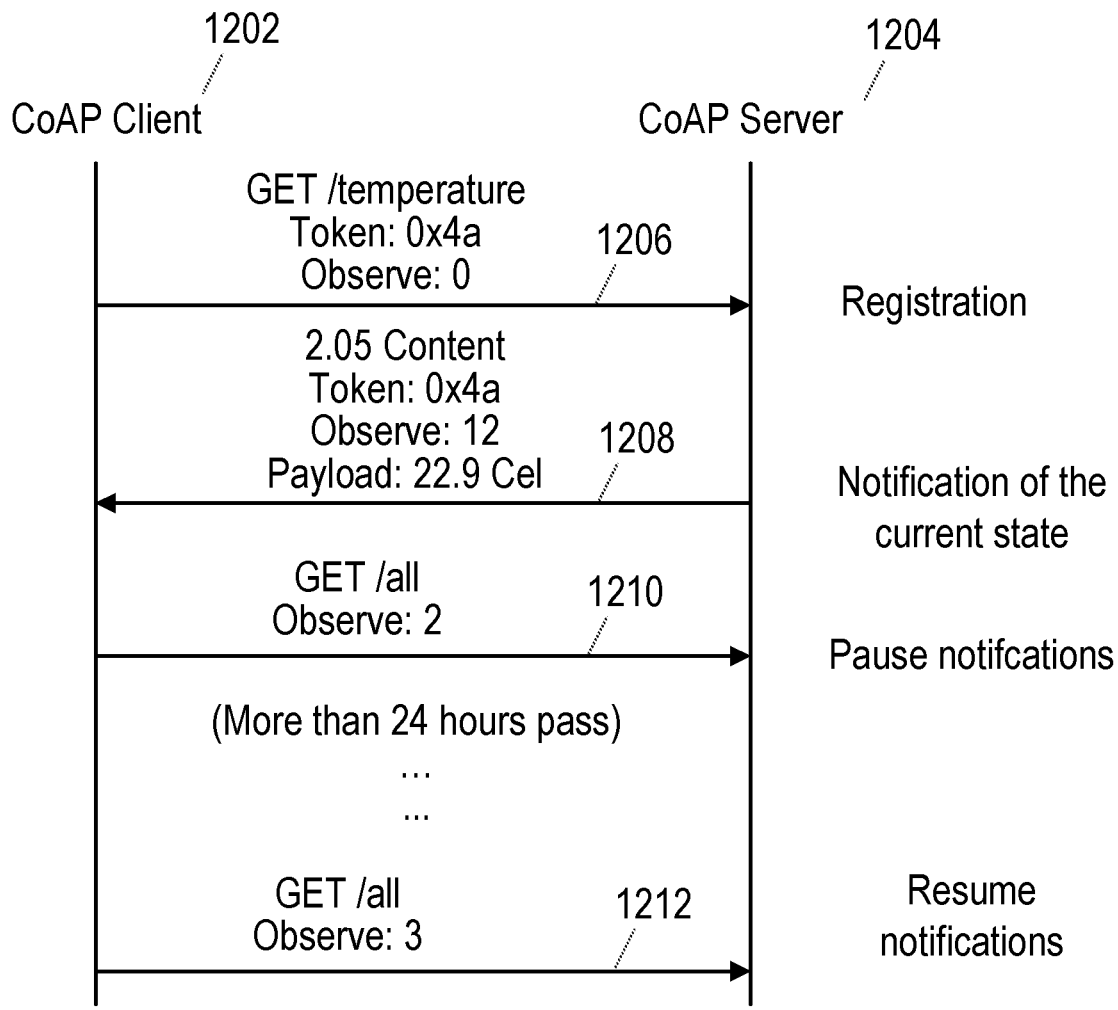

In the example message exchange of FIG. 12 between a CoAP client 1202 and a CoAP server 1204, in step 1206, the CoAP client registers its interest in a resource by sending an Observe registration to the CoAP server. As stated above, the Observe registration includes an Observe option with a value set to 0. In this illustrated example, the CoAP client 1202 registers its interest in a temperature resource. This temperature resource may relate to, for example, a temperate sensor associated with the CoAP server. In this illustrated example, the request further comprises a token that has been specified by the CoAP client 1202. In this illustrated example, the value of the token is 0x4a.

Responsive to receiving the request for information communicated by the CoAP client 1202 in step 1208, the CoAP server 1204 adds the CoAP client 1202 to the list of observers of the resource and, in step 1208, sends a notification to the CoAP client 1202 comprising a representation of the target resource. As stated above, each notification sent by the CoAP server 1204 is an additional CoAP response in reply to the single Observation registration, including an Observe option. In this illustrated example, the notification sent by the CoAP server 1204 in step 1208 comprises an Observe option with a value of 12, the value of the temperature resource of 22.9 degrees Celsius, and the value of the token of 0x4a.

At step 1210, the CoAP client 1202 sends to the CoAP server 1204 an Observe registration relating to one or more resources, the Observe registration comprising an option, the option comprising a first value that indicates that the CoAP server should pause notifications for one or more registrations corresponding to one or more resources. In this example, the option is the Observe option and the first value comprises the value 2. The Observe registration further comprises an "/all" URL indicating that the Observe registration relates to all the resources at the CoAP server 1204 that the CoAP client 1202 has registered interest in.

At step 1212, the CoAP client 1202 sends to the CoAP server 1204 a subsequent Observe registration relating to one or more resources, the subsequent Observe registration comprising an option, the option comprising a second value that indicates that the CoAP server should resume paused notifications for one or more registrations. In this example, the option comprises the Observe option and the first value comprises the value 3. The Observe registration further comprises an "/all" URL indicating that the Observe registration relates to all the resources at the CoAP server 1204 that the CoAP client 1202 has registered interest in.

Figure 13:
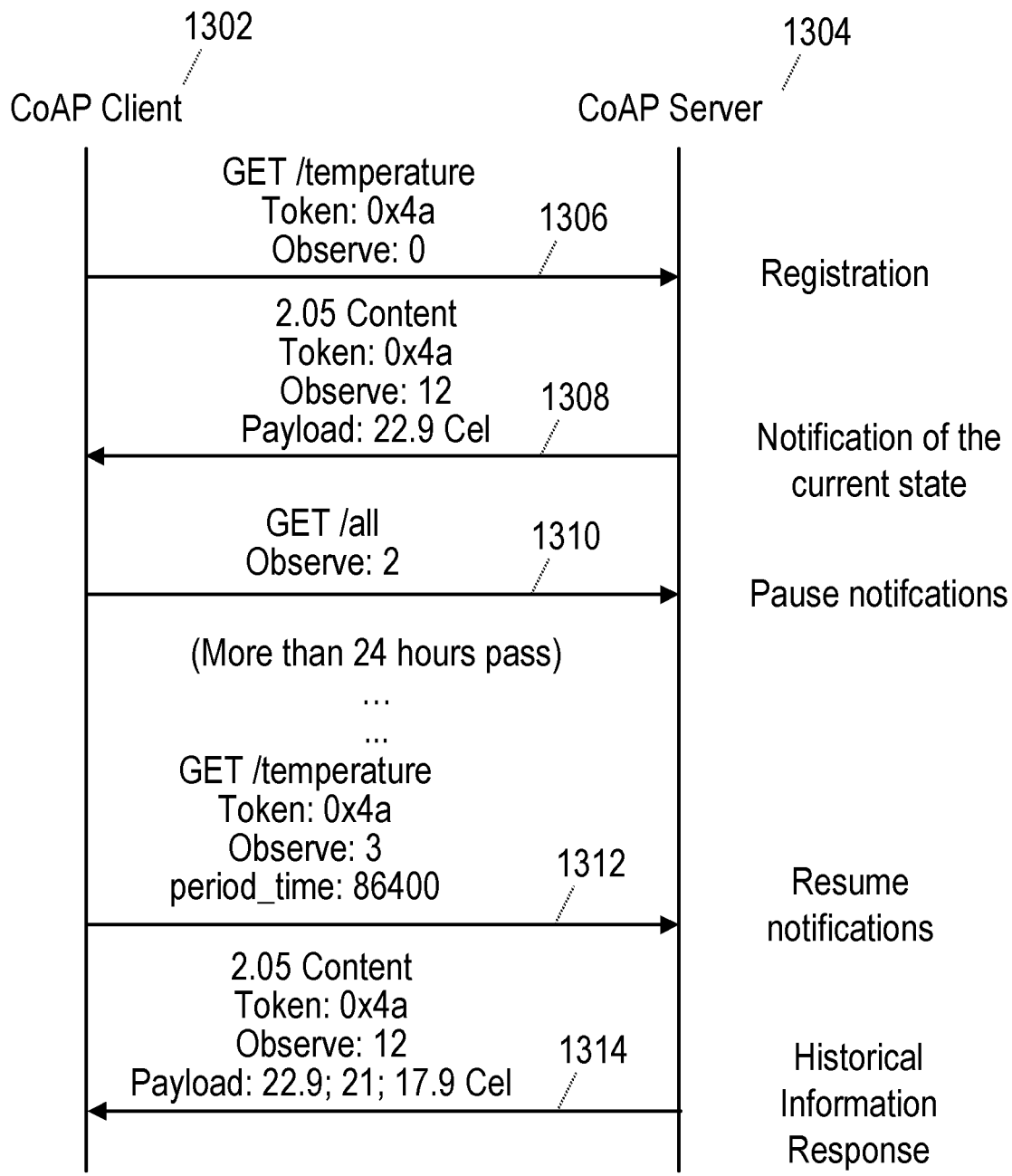

In the example message exchange of FIG. 13 between a CoAP client 1302 and a CoAP server 1304, in step 1306, the CoAP client registers its interest in a resource by sending an Observe registration to the CoAP server. As stated above, the Observe registration includes an Observe option with a value of 0. In this illustrated example, the CoAP client registers its interest in a temperature resource. This temperature resource may relate to, for example, a temperate sensor associated with the CoAP server. In this illustrated example, the Observe registration further comprises a token that has been specified by the CoAP client 1302. In this illustrated example, the value of the token is 0x4a.

Responsive to receiving the Observe registration communicated by the CoAP client 1302 in step 1308, the CoAP server 1304 adds the CoAP client 1302 to the list of observers of the resource and, in step 1308, the CoAP server 1304 sends a notification to the CoAP client 1302 comprising a representation of the target resource. As stated above, each notification sent by the CoAP server 1304 is an additional CoAP response in reply to the single Observe registration. In this illustrated example, the notification sent by the CoAP server 1304 in step 1308 comprises an Observe option with a value of 12, the value of the temperature resource of 22.9 degrees Celsius, and the value of the token of 0x4a.

At step 1310, the CoAP client 1302 sends to the CoAP server 1304 an Observe registration relating to one or more resources, the Observe registration comprising an option, the option comprising a first value that indicates that the CoAP server should pause notifications for one or more registrations corresponding to one or more resources. In this example, the option comprises the Observe option and the first value comprises the value 2. The Observe registration further comprises an "/all" URL indicating that the Observe registration relates to all the resources at the CoAP server 1304 that the CoAP client 1302 has registered interest in. The CoAP server therefore pauses notifications on all Observe registrations for the CoAP client.

At step 1312, the CoAP client 1302 sends to the CoAP server 1304 a subsequent Observe registration relating to one or more resources, the subsequent Observe registration comprising an option, the option comprising a second value that indicates that the CoAP server should resume paused notifications for one or more registrations. In this example, the option comprises the Observe option and the first value comprises the value 3. The Observe registration further comprises a "/temperature" URL indicating that the Observe registration relates to only the temperature resource at the CoAP server 1304. In this example, the subsequent Observe registration further comprises a request for information about a resource corresponding to at least one of the resumed registrations, the request for information comprising a time period option. In this example, the first time period value comprises 86400, which in this example indicates that the period of time prior to the sending of the request for information begins 86400 seconds (24 hours) prior to the sending of the request for information by the CoAP client 1302. Furthermore, in this example, the value of the token is 0x4a as in the message sent in step 1306.

At step 1314, the CoAP server 1304 responds to the request for information. In this example, the CoAP server 1304 sends a message to the CoAP client comprising information about the resource over the period of time, wherein the message comprises at least one representation of the resource over the period of time. In this example, the message comprises the values 22.9, 21 and 17.9 in the payload, corresponding to three distinct representations of the temperature resource of 22.9 degrees Celsius, 21 degrees Celsius and 17 degrees Celsius. As, in this example, all the values are in Celsius, the CoAP server only indicates the Celsius value as part of the last representation to simplify the message. In this example, although the different representations of the resource are separated by semicolons, it will be appreciated that any other appropriate symbols, or any other appropriate method of separating values in the payload may be used. In this example, the message further comprises a 2.05 content code. In this illustrated example, the notification sent by the CoAP server 1302 in step 1312 comprises an Observe option set to the value of 12 and the value of the token of 0x4a. The value of the token in the notification communicated in steps 1308 and 1314 enables the client to correlate these received notifications to the requests communicated to the CoAP client 1304 communicated in step 1306 and 1312 respectively.

Figure 14:
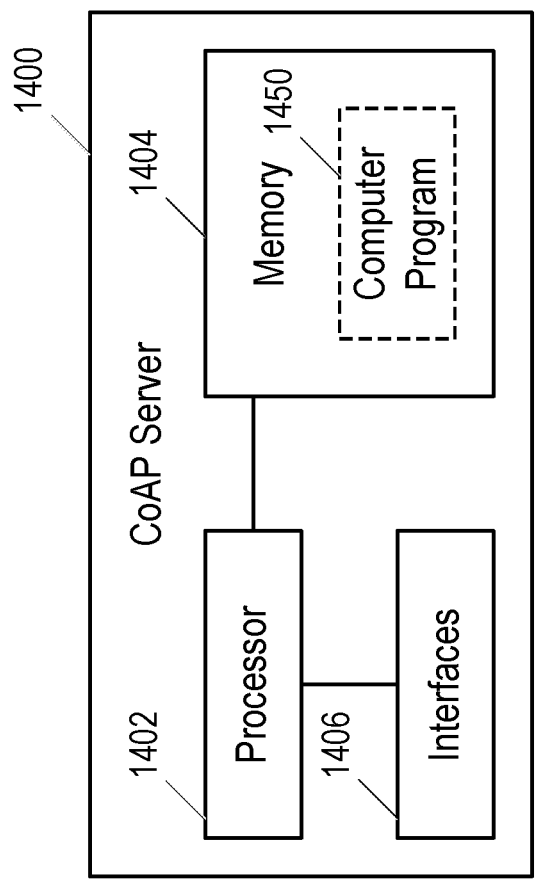
FIG. 14 is a block diagram illustrating an example CoAP server.

FIG. 14 is a block diagram illustrating an example CoAP server 1400 which may implement the method 400 and/or 500 and/or 800 and/or 900 according to examples of the present disclosure, for example on receipt of suitable instructions from a computer program 1450. Referring to FIG. 14, the CoAP server 1400 comprises a processor or processing circuitry 1402, and may comprise a memory 1404 and interfaces 1406. The processing circuitry 1402 is operable to perform some or all of the steps of the method 400 and/or 500 and/or 800 and/or 900 as discussed above with reference to FIGS. 4, 5, 8 and 9. The memory 1404 may contain instructions executable by the processing circuitry 1402 such that the CoAP server 1400 is operable to perform some or all of the steps of the method 400 and/or 500 and/or 800 and/or 900. The instructions may also include instructions for executing one or more telecommunications and/or data communications protocols. The instructions may be stored in the form of the computer program 1450. In some examples, the processor or processing circuitry 1402 may include one or more microprocessors or microcontrollers, as well as other digital hardware, which may include digital signal processors (DSPs), special-purpose digital logic, etc. The processor or processing circuitry 1402 may be implemented by any type of integrated circuit, such as an Application Specific Integrated Circuit (ASIC), Field Programmable Gate Array (FPGA) etc. The memory 1404 may include one or several types of memory suitable for the processor, such as read-only memory (ROM), random-access memory, cache memory, flash memory devices, optical storage devices, solid state disk, hard disk drive etc.

Figure 15:
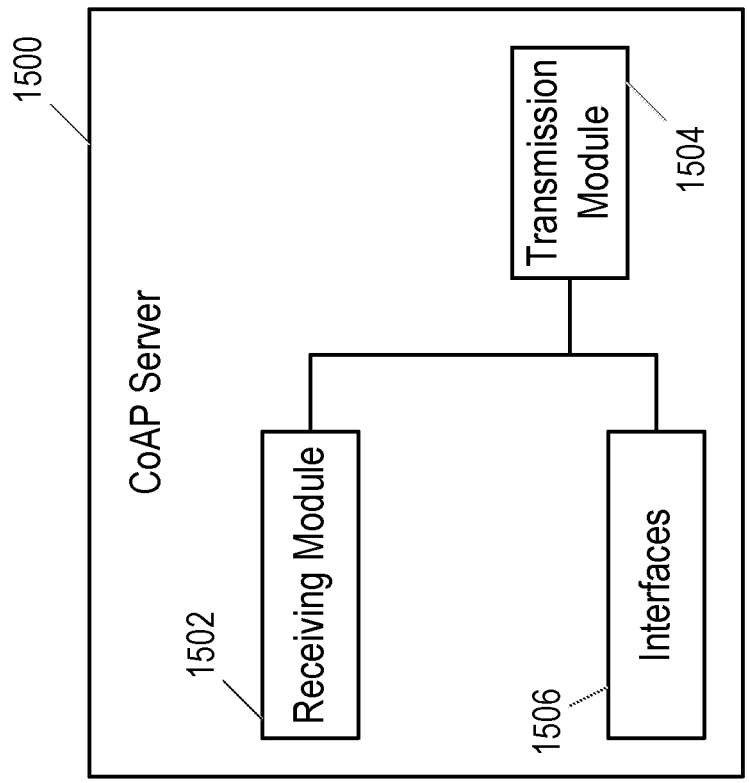
FIG. 15 is a block diagram illustrating another example CoAP server.

FIG. 15 illustrates functional units in another example of CoAP server 1500 which may execute examples of the method 400 and/or 500 of the present disclosure, for example according to computer readable instructions received from a computer program. It will be understood that the units illustrated in FIG. 15 are functional units, and may be realised in any appropriate combination of hardware and/or software. The units may comprise one or more processors and may be integrated to any degree.

Referring to FIG. 15, the CoAP server 1500 comprises a receiving module 1502 for receiving from a CoAP client a request for information about a resource, the request for information comprising a time period option that comprises a time period value, and a transmitting module 1504 for responding to the request. The CoAP server 1500 may also comprise interfaces 1506.

Figure 16:
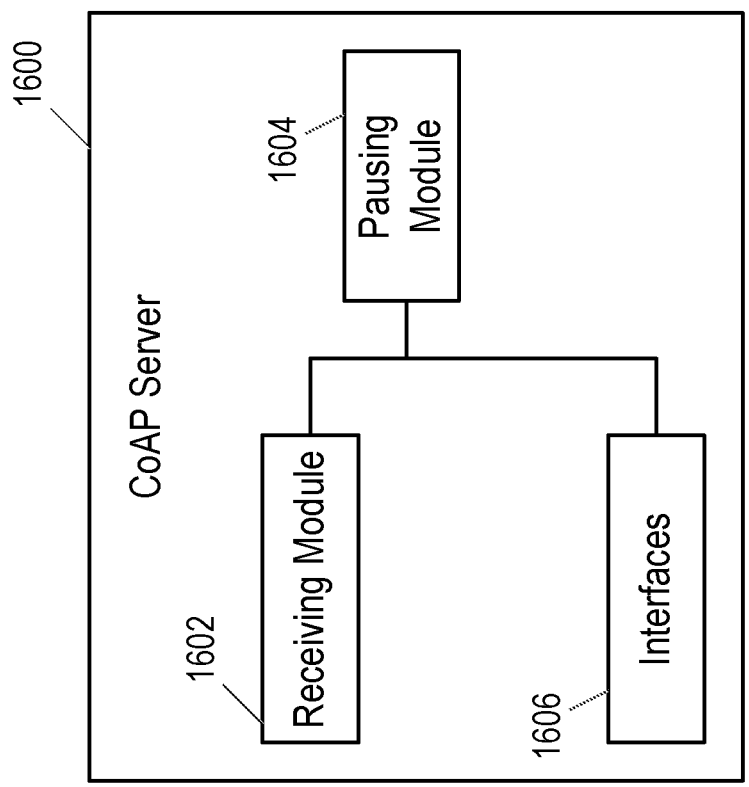
FIG. 16 is a block diagram illustrating another example CoAP server.

FIG. 16 illustrates functional units in another example of CoAP server 1600 which may execute examples of the method 800 and/or 900 of the present disclosure, for example according to computer readable instructions received from a computer program. It will be understood that the units illustrated in FIG. 16 are functional units, and may be realised in any appropriate combination of hardware and/or software. The units may comprise one or more processors and may be integrated to any degree.

Referring to FIG. 16, the CoAP server 1600 comprises a receiving module 1602 for receiving from a CoAP client a CoAP Observe registration relating to one or more resources, the CoAP Observe registration comprising an option, the option comprising a first value that indicates that the CoAP server should pause notifications for one or more registrations, and a pausing module 1604 for pausing the one or more registrations. The CoAP server 1600 may also comprise interfaces 1606.

Figure 17:
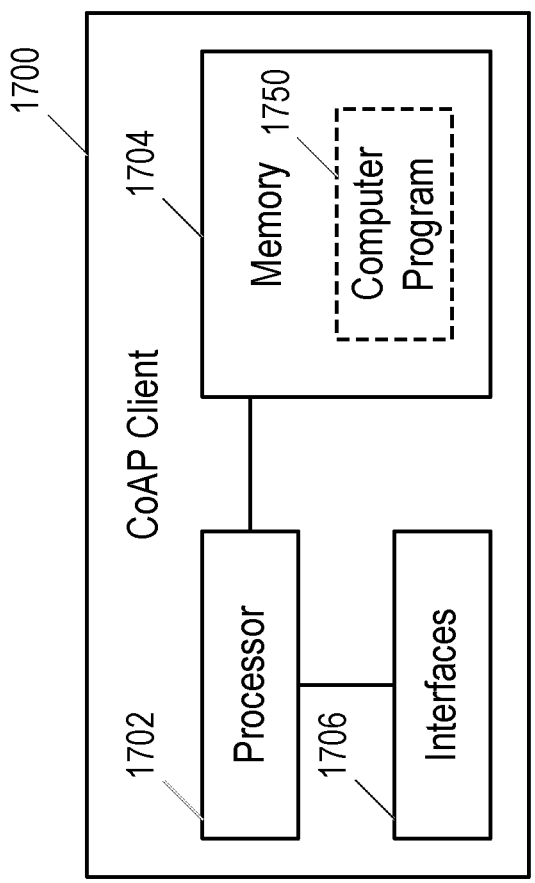
FIG. 17 is a block diagram illustrating an example CoAP client.

FIG. 17 is a block diagram illustrating an example CoAP client 1700 which may implement the method 200 and/or 300 and/or 600 and/or 700 according to examples of the present disclosure, for example on receipt of suitable instructions from a computer program 1750. Referring to FIG. 17, the CoAP client 1700 comprises a processor or processing circuitry 1702, and may comprise a memory 1704 and interfaces 1706. The processing circuitry 1702 is operable to perform some or all of the steps of the method 200 and/or 300 and/or 600 and/or 700 as discussed above with reference to FIGS. 2, 3, 6 and 7. The memory 1704 may contain instructions executable by the processing circuitry 1702 such that the CoAP client 1700 is operable to perform some or all of the steps of the method 200 and/or 300 and/or 600 and/or 700. The instructions may also include instructions for executing one or more telecommunications and/or data communications protocols. The instructions may be stored in the form of the computer program 1750. In some examples, the processor or processing circuitry 1702 may include one or more microprocessors or microcontrollers, as well as other digital hardware, which may include digital signal processors (DSPs), special-purpose digital logic, etc. The processor or processing circuitry 1702 may be implemented by any type of integrated circuit, such as an Application Specific Integrated Circuit (ASIC), Field Programmable Gate Array (FPGA) etc. The memory 1704 may include one or several types of memory suitable for the processor, such as read-only memory (ROM), random-access memory, cache memory, flash memory devices, optical storage devices, solid state disk, hard disk drive etc.

Figure 18:
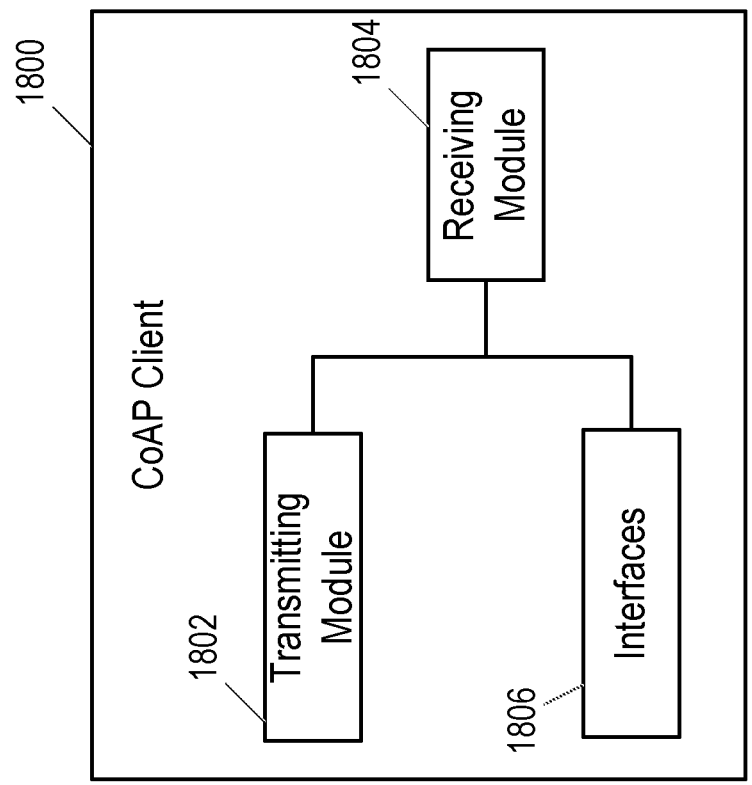
FIG. 18 is a block diagram illustrating another example CoAP client.

FIG. 18 illustrates functional units in another example of CoAP client 1800 which may execute examples of the method 200 and/or 300 of the present disclosure, for example according to computer readable instructions received from a computer program. It will be understood that the units illustrated in FIG. 18 are functional units, and may be realised in any appropriate combination of hardware and/or software. The units may comprise one or more processors and may be integrated to any degree.

Referring to FIG. 18, the CoAP client 1800 comprises a transmitting module 1802 for sending to a CoAP server a request for information about a resource, the request comprising a time period option, wherein the time period option comprises a first time period value that indicates a period of time prior to the sending of the request over which information about the resource is requested, and a receiving module 1804 for receiving a response to the request for information. The CoAP client may also comprise interfaces 1806.

Figure 19:
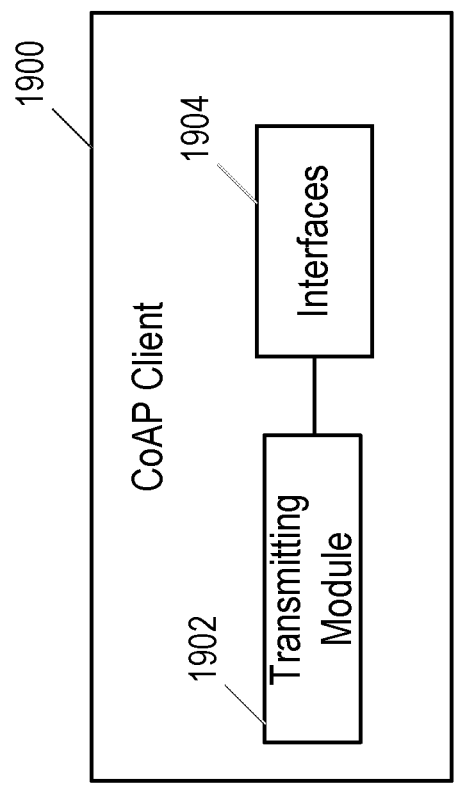
FIG. 19 is a block diagram illustrating another example CoAP client.

FIG. 19 illustrates functional units in another example of CoAP client 1900 which may execute examples of the methods 600 and/or 700 of the present disclosure, for example according to computer readable instructions received from a computer program. It will be understood that the units illustrated in FIG. 19 are functional units, and may be realised in any appropriate combination of hardware and/or software. The units may comprise one or more processors and may be integrated to any degree.

Referring to FIG. 19, the CoAP client 1900 comprises a transmitting module 1902 for sending to a CoAP server an Observe registration relating to one or more resources, the Observe registration comprising an option, the option comprising a first value that indicates that the CoAP server should pause notifications for one or more registrations corresponding to one or more resources. The CoAP client may also comprise interfaces 1904.

Examples of the present disclosure thus provide a CoAP server and client, and methods performed in a CoAP server and client, that expand on the existing CoAP Observe mechanism. The Observe mechanism as currently specified does not allow representations of a resource from periods of time in the past, prior to the receipt of a request for information (in other words, historical information relating to the resource) to be provided to a CoAP client. In addition to this, the Observe mechanism requires that the CoAP server sends a notification comprising an updated representation of the target resource to the CoAP client in a confirmable message at least every 24 hours. If the CoAP client does not respond to this confirmable message, the CoAP server will remove the CoAP client from the list of observers of the corresponding resource.

Examples of the present disclosure provide mechanisms for obtaining historical information relating to a resource, and for pausing and resuming notifications relating to a resource. The aspects may be combined to allow a CoAP client to pause notifications before entering an extended sleeping period, and, upon waking, resume notifications and obtain information about the state of the resource during the period in which the CoAP client was sleeping. This avoids a CoAP client being deregistered form resources, and also avoids cumbersome intentional deregistering and re-registering. In addition, the CoAP client may "catch up" on data that was missed while the CoAP client was sleeping though the requesting of historical data for the period in which it was sleeping. A CoAP client may also pause notifications for other reasons, such as when temporarily not useful, during times of network congestion etc. A CoAP client may pause all or only some registrations, such that notifications on the most important resources continue to be delivered while others are paused. Examples of the present disclosure may thus address existing challenges relating to the Observe mechanism, as well as offering savings relating to device energy and network throughput.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A constrained application protocol (CoAP) client comprising processing circuitry configured to:
   send to a CoAP server a request for information about a resource, the request for information comprising a time period option, the time period option comprising a first time interval value and a second time interval value, the first time interval value indicating a first minimum period of time to elapse between successive representations of the resource to be included in each of at least one notification to be provided by the CoAP server, the second time interval value indicating a second minimum period of time to elapse between successive representations of the resource to be included in the at least one notification to be provided by the CoAP server, the request for information further including a CoAP Observe registration that includes an observe Option; and
   receive a response to the request for information.

2. The CoAP client as claimed in claim 1, wherein the information about the resource comprises the resource over a specified period of time.

3. The CoAP client as claimed in claim 2, wherein the request for information further comprises a timestamp option, wherein the timestamp option comprises a first timestamp value, wherein the first timestamp value indicates that at least one timestamp corresponding to each representation of the resource is requested.

4. The CoAP client as claimed in claim 1, wherein the processing circuitry is further configured to:
   receive a response to the CoAP Observe registration, wherein the response to the CoAP Observe registration comprises a message sent by the CoAP server comprising a current representation of the resource; and
   receive a subsequent response to the CoAP Observe registration, wherein the subsequent response to the CoAP Observe registration comprises a message sent by the CoAP server comprising an updated representation of the resource, wherein the current representation of the resource and the updated representation of the resource are separated by the minimum period of time.

5. A constrained application protocol (CoAP) server that is operable to provide information about at least one resource, the CoAP server comprising processing circuitry configured to:
   receive from a CoAP client a request for information about a resource, the request for information comprising a time period option, the time period option comprising a first time period value and a second time interval value, the first time interval value indicating a first minimum period of time to elapse between successive representations of the resource to be included in each of at least one notification to be provided by the CoAP server, the second time interval value indicating a second minimum period of time to elapse between successive representations of the resource to be included in the at least one notification to be provided by the CoAP server, the request for the information further including a CoAP Observe registration that includes an Observe option; and
   respond to the request for the information.

6. The CoAP server as claimed in claim 5, wherein the information about the resource comprises at least one representation of the resource over the period of time.

7. The CoAP server as claimed in claim 6, wherein the request for information further comprises a timestamp option, wherein the timestamp option comprises a first timestamp value, wherein the first timestamp value indicates that at least one timestamp corresponding to each of the at least one representation of the resource is requested.

8. The CoAP server as claimed in claim 6, wherein the processing circuitry is configured to respond to the request for information by:
   sending a message to the CoAP client comprising information about the resource over the period of time.

9. The CoAP server as claimed in claim 5, wherein the processing circuitry is further configured to respond to the request for information by:
   sending a message to the CoAP client comprising information about the resource over a specified period of time wherein the information about the resource over the specified period of time comprises representations of the resource that are separated by the first minimum period of time.

10. The CoAP server as claimed claim 9, wherein the information about the resource over the specified period of time further comprises a timestamp corresponding to each of the representations of the resource included within the message.

11. The CoAP server as claimed in claim 5, wherein the processing circuitry is further configured to respond to the Observe registration by:
    sending a message to the CoAP client comprising the current representation of the resource; and
    responsive to a condition for sending an updated representation of the resource being fulfilled, and after the second minimum period of time elapsing from the sending of the first message, sending a subsequent message to the CoAP client comprising an updated representation of the resource.

12. A method performed by a constrained application protocol (CoAP) client, the method comprising:
    sending to a CoAP server a request for information about a resource, the request for information comprising a time interval option, the time interval option comprising a first time interval value and a second time interval value, the first time interval value indicating a minimum period of time to elapse between successive representations of the resource, the second time interval value indicating a second minimum period of time to elapse between successive representations of the resource to be included in each notification to be provided by the CoAP server, the request for information further including a CoAP Observe registration that includes an observe Option; and receiving a response to the request for information.

13. A method performed by a constrained application protocol (CoAP) server that is operable to provide information about at least one resource, the method comprising:

receiving from a CoAP client a request for information about a resource, the request for information comprising a time interval option, the time interval option comprising a first time interval value and a second time interval value, the first time interval value indicating a minimum period of time to elapse between successive representations of the resource, the second time interval value indicating a second minimum period of time to elapse between successive representations of the resource to be included in at least one notification to be provided by the CoAP server, the request for information further including a CoAP Observe registration that includes an observe Option; and responding to the request for information.

* * * * *